(12) United States Patent
Vancini et al.

(10) Patent No.: US 8,374,961 B2
(45) Date of Patent: *Feb. 12, 2013

(54) ON-LINE PAYMENTS FACILITY

(75) Inventors: Adam E. Vancini, Concord, CA (US); Timothy J. Dailey, Sacramento, CA (US); Candie L. Gann, Pittsburg, CA (US); Timothy L. Coffing, Ross, CA (US); Nancy T. Riter, Pleasanton, CA (US); Ajay Vaishampayan, Fremont, CA (US); Aric B. Clark, Mill Valley, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/879,839

(22) Filed: Sep. 10, 2010

(65) Prior Publication Data

US 2010/0332386 A1    Dec. 30, 2010

Related U.S. Application Data

(63) Continuation of application No. 11/424,802, filed on Jun. 16, 2006, now Pat. No. 7,814,017.

(60) Provisional application No. 60/693,873, filed on Jun. 24, 2005.

(51) Int. Cl.
*G06Q 40/00* (2006.01)
(52) U.S. Cl. ............... 705/42; 705/39; 705/40; 705/41; 705/43
(58) Field of Classification Search .............. 705/39, 705/40, 41, 42, 43
See application file for complete search history.

(56) References Cited

U.S. PATENT DOCUMENTS

| | | | |
|---|---|---|---|
| 6,119,107 A | 9/2000 | Polk | |
| 6,182,052 B1 | 1/2001 | Fulton et al. | |
| 6,223,983 B1 | 5/2001 | Kjonaas et al. | |
| 6,374,231 B1 | 4/2002 | Bent et al. | |
| 6,385,595 B1 | 5/2002 | Kolling et al. | |
| 6,401,079 B1 | 6/2002 | Kahn et al. | |
| 6,411,938 B1 | 6/2002 | Gates et al. | |

(Continued)

FOREIGN PATENT DOCUMENTS

| | | |
|---|---|---|
| WO | WO-00/36570 | 6/2000 |
| WO | WO-00/49552 | 8/2000 |

(Continued)

OTHER PUBLICATIONS

Osdoby Jaffe, M., Lessons of the Past Point ACH to New Markets, Mar. 1988, Bank Systems & Equipment, vol. 25, No. 3, pp. 54-55, USA.

(Continued)

*Primary Examiner* — Nga B. Nguyen
(74) *Attorney, Agent, or Firm* — Foley & Lardner LLP

(57) ABSTRACT

A computer system implements a counterparty management module and a payment module for processing employee direct payroll deposits. The counterparty management module permits an employer to add employee bank accounts to a funds transfer system provided by a banking institution. The employee bank accounts are respectively associated with different employees of the employer. The employer has a bank account at the banking institution. The counterparty management module is accessible to the employer by way of an online banking area of a website of the banking institution. The counterparty management module also permits the employer to specify a payroll-related pay group that includes the employee bank accounts and to specify characteristics of the transferring of funds to the pay group as a whole. The payment module generates payment instructions for transferring funds from the employer bank account to the employee bank accounts.

14 Claims, 17 Drawing Sheets

U.S. PATENT DOCUMENTS

| | | | |
|---|---|---|---|
| 6,882,986 | B1 | 4/2005 | Heinemann et al. |
| 7,376,587 | B1* | 5/2008 | Neofytides et al. ......... 705/26.35 |
| 7,395,241 | B1 | 7/2008 | Cook et al. |
| 7,814,017 | B2* | 10/2010 | Vancini et al. .................. 705/42 |
| 2002/0007332 | A1 | 1/2002 | Johnson et al. |
| 2002/0016769 | A1* | 2/2002 | Barbara et al. .................. 705/40 |
| 2002/0042773 | A1 | 4/2002 | Fugitte et al. |
| 2002/0082987 | A1 | 6/2002 | Wilson |
| 2002/0087344 | A1 | 7/2002 | Billings et al. |
| 2002/0087469 | A1 | 7/2002 | Ganesan et al. |
| 2002/0133459 | A1 | 9/2002 | Polk et al. |
| 2003/0105710 | A1 | 6/2003 | Barbara et al. |
| 2003/0191711 | A1 | 10/2003 | Jamison et al. |
| 2004/0015400 | A1 | 1/2004 | Whymark |
| 2004/0015438 | A1 | 1/2004 | Compiano et al. |
| 2004/0210517 | A1* | 10/2004 | Brooks et al. .................. 705/39 |
| 2005/0044021 | A1 | 2/2005 | Schafer |
| 2005/0125321 | A1 | 6/2005 | Gerstner et al. |
| 2005/0125348 | A1 | 6/2005 | Fulton et al. |
| 2005/0149287 | A1 | 7/2005 | Hanes et al. |
| 2005/0234820 | A1 | 10/2005 | MacKouse |

FOREIGN PATENT DOCUMENTS

| | | |
|---|---|---|
| WO | WO-00/68853 | 11/2000 |
| WO | WO-00/72208 | 11/2000 |
| WO | WO-01/25992 | 4/2001 |
| WO | WO-01/39077 | 5/2001 |
| WO | WO-01/50304 | 7/2001 |
| WO | WO-01/53977 | 7/2001 |
| WO | WO-01/84906 | 11/2001 |
| WO | WO-02/35436 | 5/2002 |
| WO | WO-03/009084 | 1/2003 |
| WO | WO-03/030054 | 4/2003 |
| WO | WO-03/077080 | 9/2003 |
| WO | WO-03/079261 | 9/2003 |
| WO | WO-2005/013220 | 2/2005 |
| WO | WO-2005/017694 | 2/2005 |
| WO | WO-2005/024577 | 3/2005 |
| WO | WO-2005/026896 | 3/2005 |
| WO | WO-2005/050374 | 6/2005 |

OTHER PUBLICATIONS

Payroll by Direct Deposit Now! http://www.zpay.com/, Copyright 1983-2005, ZPAY Payroll Systems, Inc.
PointSpeed's Business Purchasing Centers to Offer BankServ E-checks as New Payment Method for Small Business, Aug. 11, 2000, Business Wire.
Quittner, Jeremy, Internet Turns Entrepreneurs into More Attractive Clients, Oct. 1, 2004, American Banker.
Quittner, Jeremy, Serving the Complex Needs of Small Business Owners, Mar. 23, 2005, American Banker, vol. 169, No. 56, p. 4a, USA.
S1 Corporation Implements Automated House Cleaning Solution for FleetBoston Financial, Nov. 14, 200, Business Wire.
Wade, Will, Going Simple to Bring Business Payments Online, Apr. 13, 2005, American Banker, vol. 170, No. 70, p. 1, The Gale Group.
Web Direct Deposit: A Secure Online Service for Processing Payroll Files, http://www.nationalpayment.com/edit/ddplus/solutions/wdd.html, 2005, National Payment Corporation.
Wilson, Caroline, Cash Management Services, May 2001, Community Banker, vol. 10, No. 5, pp. 22-25.
Wilson, Caroline, Corporate Cash Management Technology Grows More Flexible, Nov. 2002, Community Banker, vol. 11, No. 11, pp. 88-92.
Aurum Delivers 2nd Generation Business Internet Banking Solution. Signs Multiple Customers, Feb. 2003, PR Newswire, USA.
Automatic Clearing House ACH/Direct Deposit, http://www.compassweb.com/business/tm/disbursement_services/ach_direct_deposit/ 2005, Compass Banoshares, Inc.
Bers, Joanna Smith, Capturing the Burgeoning Small Business Market via the Internet, Oct. 1996, Bank Systems & Technology, vol. 33, No. 10, pp. 40-43.

Byrne, Bill, Nacha's Marketing Management Group Announces Results of Small and Medium Business ACH Awareness and Usage Survey, http://www.directdeposit.org/downloads/ach_usage.doc.
Clark, K., Cutting Out Checks Cuts Costs [Payroll Cards], Oct. 2002, Chain Store Age, vol. 78, No. 10, p. 78, Lebhar-Friedman, USA.
Clark, K., Payroll Debit Cards Ease the Pain of Pay Day, Apr. 2004, Chain Store Age, vol. 80, No. 4, pp. 94-95, Lebhar-Friedman, USA.
Cohn, Micheal, 21st Century Payroll, Feb./Mar. 1996, Accounting Technology, vol. 12, No. 2, pp. 18-29.
Computer Resources Inc. Brings Payroll Expertise to Inuit's New Quickbooks Online Payroll Service, Sep. 15, 1998, Business Wire.
Demery, Paul, Leveraging Software for Payroll Payoff, Jun. 1995, Practical Accountant, vol. 26, No. 6, pp. 40-48.
Direct Deposit Plus: A Payroll Solution That's Safe, Simple, and the Smart Way to Pay, http://www.nationalpayment.com/edit/ddplus/solutions/ddplus.html, 2005, National Payment Corporation.
Direct Deposit, http://www.wachovia.com/small_biz/page/0,,446_610_1301_1306,00.html, 2005, Wachovia Corporation.
Duffy, H., Companies Warm to Direct Deposit of Payroll; Banks Can Do More to Foster Its Growth, Feb. 1990, Bank Management, vol. 66, No. 2, pp. 56-58, USA.
Dungan, J., The Tamar Inns Software Solution for HR/Payroll Integration, Nov. 1995, Management Accounting, vol. 77, No. 5, pp. 62-64, USA.
EZ Direct Deposit—Online Banking Through Your Account Software, http://www.ezdd.com/products/onlinebanking/faqs.html, 2003, Coastal Software & Consulting, Inc.
FAQ for PayCycle Services, http://www.paycycle.com/services/faq.jsp?catid=7, 200-2005, PayCycle, Inc. Version 2005R3.1.
Frequently Asked Questions (FAQs) About Direct Deposit, http://www.chase.com/cm/cs?pagename=Chase/Href&urlname=chase/ab/pap/payrollsvs/ddp/faq, 2005, JP Morgan Chase & Co.
Fuentebella, C., Chase Lincoln Wires Up for On-line ACH, Feb. 1989, Bank Systems & Equipment, vol. 26, No. 2, pp. 48-49, USA.
Google Search: Employee Direct Deposit ACH Small Business, http://www.google.com/search?hl=en&lr*&client=safari&rls=en&q*+++employee+direct+deposit+ach+small+business&btnG=Search.
Gootar, S., The Electronic State of Cash Management, Nov. 1986, FE: The Magazine for Financial Executives, vol. 2, No. 11, pp. 10-15, USA.
Haug, L.A., States Still Roadblock Direct Deposit (Employee Payment), Sep. 1994, ABA Banking Journal, vol. 86, No. 9, pp. 84,86,88, USA.
Huntington Implements Business Banking Solutions Online, Apr. 3, 2000, PR Newswire.
Hyman, J.P., EFTA Creates Foundation to Educate Public on EFT, Jun. 1987, Bank Systems & Equipment, vol. 24, No. 6, p. 43, USA.
Intuit to Offer Direct Deposit Services to Quickbook Users, http://web.intuit.com/about_intuit/press_releases/1998/09-15b.html, 1998, Press Release.
Lang, S.M., Getting Online to Pay, Jan.-Feb. 1997, Financial Executive, vol. 13, No. 1, pp. 38-41, Financial Executives Inst., USA.
Magnet Provides Easy, Secure ACH for Regions Bank. Online Solution Enhances Regions' Services, Oct. 3, 2001, Business Wire.
National Payment: Payroll Distribution Solutions, http://www.nationalpayment.com, 2005, National Payment Corporation.
New to Market (Financial Services), Dec. 14, 2004, Electronic Payments Week, vol. 1, No. 14.
Notice of Allowance for U.S. Appl. No. 11/424,802, mail date Jun. 7, 2010, 9 pages.
O'Connel, Brian, Internet Cash Management Takes Off (Business Companies and Marketing), Jan. 2000, Bank Technology News, vol. 13, No. 1.
Office Action for U.S. Appl. No. 11/424,802, mail date Mar. 17, 2009, 18 pages.
Office Action for U.S. Appl. No. 11/424,802, mail date Oct. 14, 2009, 20 pages.
Office Action for U.S. Appl. No. 11/424,802, mail date Sep. 15, 2008, 14 pages.

* cited by examiner

FIG. 9

Wells Fargo Direct Pay Enrollment: Step 1 of 3 - Mozilla Firefox

File  Edit  View  Go  Bookmarks  Tools  Help

WELLS FARGO

Home | Help Center | Contact Us | Site Map | Sign Off

Direct Pay Enrollment: Step 1 of 3

Company Name/TIN: John's Air Taxi 123-23-3345
Choose the billing account and funding account you want to use for Direct Pay, and click Save.
Billing Account: (This is the account you will use to pay fees for the service.)
John's Checking 123-5712XXX ▼
Funding Account: (This is the account you will use to pay your employees and contractors.)
John's Checking 123-5712XXX ▼

Choose email address(es)
We'll only use the email address(es) you choose below to send critical Direct Pay messages that may require action by you.

☑ Primary Email:     John@wellsfargo.com
☑ Secondary Email:   John@yahoo.com
☐ Other Email:       John@abc.com
☐ Wireless Device:   12345@imcingular.com Change or add more email addresses as contact points.

[Cancel]                                        [Save]

Home | Help Center | Contact Us | Site Map | Sign Off
1995-2003 Wells Fargo. All Rights Reserved.

FIG. 10

Wells Fargo Direct Pay Enrollment: Step 2 of 3 - Verify - Mozilla Firefox

File  Edit  View  Go  Bookmarks  Tools  Help

WELLS FARGO

Home | Help Center | Contact Us | Site Map | Sign Off

Direct Pay Enrollment: Step 2 of 3 - Verify

Company Name/TIN: John's Air Taxi 123-23-3345

Please verify the information below and click Continue. If you need to make changes, click the Back button. Your enrollment will be complete once you have accepted the Direct Pay Agreement on the next page.

Billing Account:  John's Checking 1234-567XXXX
Funding Account:  Payroll Checking 1234-56XXXX
Email Address(es):  John@wellsfargo.com
John@yahoo.com

[Back]                    [Cancel]                    [Continue]

Home | Help Center | Contact Us | Site Map | Sign Off
1995-2003 Wells Fargo. All Rights Reserved.

Done

Wells Fargo Direct Pay Create Payment: Step 1 of 4 - Mozilla Fox
File  Edit  View  Go  Bookmarks  Tools  Help

WELLS FARGO

Home | Help Center | Contact Us | Site Map | Sign Off

Direct Pay

| Main Page | Payments | Payees | Admin | My Message Center |

Payment Summary ▶ Create Payment    Reports

Create Payment Step 1 of 4

To create a payment select a Pay Group. (You'll be able to choose which individual Payees in this Pay Group to make a payment to.) Then choose whether you want this to be a one-time or recurring payment.

Pay Group: [Payee Master List ▼]

● This is a one-time payment
○ This is a recurring payment

[Continue]

Home | Help Center | Contact Us | Site Map | Sign Off
1995-2003 Wells Fargo. All Rights Reserved.

*Wells Fargo Direct Pay Create Payment: Step 3 of 4 - Mozilla Firefox*

File  Edit  View  Go  Bookmarks  Tools  Help

WELLS FARGO

Home | Help Center | Contact Us | Site Map | Sign Off

Direct Pay

| Main Page | Payments | Payees | Admin | My Message Center |

Payment Summary ▶ Create Payment | Reports

Create Payment Step 3 of 4

Complete the fields below and click Continue.

Pay Date: (mm/dd/yy)
Pay Date is the day you'd like your Payees to have access to funds.

Send Date:
Send Date is the day funds will leave your account.
○ One business days before pay date (cut off time- 15:00 Pacific Time)
◉ Two business days before pay date * (cut off time- 15:00 Pacific Time)

Total Payment Amount: $9,200.00 (2 Payees)

Funding Account: Business Checking 245-6543XX (Avail. balance = $40,245.22)

Description: (optional)
This will appear on your statement.

Payee Memo (optional)
This will appear in the payment notification email sent to each Payee.

*Recommended to ensure that all your payees can access funds online or by ATM on Pay Date.

[Back]  [Cancel]  [Continue]

Home | Help Center | Contact Us | Site Map | Sign Off
1995-2003 Wells Fargo. All Rights Reserved.

FIG. 16

Wells Fargo Direct Pay Create Payment: Step 3 of 4 - Mozilla Firefox

File   Edit   View   Go   Bookmarks   Tools   Help

☐ Wells Fargo Direct Pay Create Pa...   ☐ Wells Fargo Direct Pay Create...

WELLS FARGO

Home | Help Center | Contact Us | Site Map | Sign Off

Direct Pay

| Main Page | Payments | Payees | Admin | Reports | My Message Center |

Payment Summary ▲ Create Payment

Create Payment: Step 3 of 4

Complete the fields below and click Continue.

Pay Date: (First Pay Date mm/dd/yy)
Pay Date is the day you'd like your Payees to have access to funds.
[ 🗓 ]

Payment Pattern:
○ Weekly               Pay On [Select One ▼] of every week
○ Every Other Week     Pay On [Select One ▼] of every other week
○ Twice a Month        Pay On [Select One ▼] and [Select One ▼] of every month
○ Monthly              Pay On [Select One ▼] of every month

Send Date: (Last Pay Date mm/dd/yy)
[ 🗓 ]

End Date:
Send Date is the day funds will leave your account.
○ One business day before pay date (cut off time - 17:00 Pacific Time).
◉ Two business day before pay date * (cut off time - 17:00 Pacific Time).

Total Payment Amount:     $4,000.00 (2 Payees)

Funding Account:           Business Checking 123-57120XX (Avail. balance=$40,245.22)

Description: (optional)
This will appear on your statement.
[                    ]

Payee Memo: (optional)
This will appear in the payment notification email sent to each Payee.
[                    ]

*Recommended to ensure that all your payees can access funds online or by ATM on Pay Date.

[Back]                                                              [Cancel]   [Continue]

Home | Help Center | Contact Us | Site Map | Sign Off
1995-2003 Wells Fargo. All Rights Reserved.

Done

FIG. 17

Wells Fargo Direct Pay Alert Details - Mozilla Firefox

File  Edit  View  Go  Bookmarks  Tools  Help

[ ] Wells Fargo Direct Pay Create Pa...  [ ] Wells Fargo Direct Pay Create Pa...  [ ] Wells Fargo Direct Pay Alert D...

WELLS FARGO

Alert Details                                                                                     Close Alert 2 of 200

Sent Date:            06/15/03 7:45 Pacific Time
Description:          Payment to Payee Failed
Reason:               Payment to Payee failed at receiving institution on 06/14/03 15:00 Pacific Time because of incorrect payee account number.
Detailed Summary:     Original Transaction ID: 438923843923
                          Return Transaction ID: 438923843923

Pay-group: Special Bonus Payroll (8 payees)
                          Send On: 05/14/2003
                          Pay On: 06/16/2003
                          Total Payment Amount: $12590.00
                          Payment Type: Recurring/Monthly Payee Name: Parker, Peter
                          Account Details: 238923892; 32893238: Checking
                          Financial Institution: Bank Of America
                          Amount: $7800.00

Recommended Solution: Click on Payees tab to correct payee's account details and submit a new payment for this payee.
Send To:              Douglas, Lloyd E
                          Hicks, Granville W
                          Mitchell, Margaret K Done

*FIG. 18*

| | Wells Fargo Direct Pay Alerts for TIN - Mozilla Firefox | _ 🗗 × |
|---|---|---|
| | File Edit View Go Bookmarks Tools Help | |

WELLS FARGO

<< Back to TIN Summary

Direct Pay: Banker

Alerts for TIN- Sam's Salad Bar Inc. 123-23-3345

Alerts 1 to 50 of 200
<< Previous Page

Page 1 of 4
Next Page >>

| Description ▼ | Sent ▼ | Action |
|---|---|---|
| Welcome to Direct Pay | 06/15/2003 at 7:45 PST | View Details |
| 🔲 Payment to payee Failed | 06/14/2003 at 10:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| 🔲 Payment to Payee Failed | 06/15/2003 at 7:45 PST | View Details |
| Payment Created - Needs Approval | 06/14/2003 at 10:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |
| Payment Created - Needs Approval | 03/01/2003 at 8:45 PST | View Details |

Done

ON-LINE PAYMENTS FACILITY

CROSS-REFERENCE TO RELATED APPLICATIONS

This application is a continuation of U.S. Ser. No. 11/424,802, filed Jun. 16, 2006, which claims the benefit of U.S. Provisional Application No. 60/693,875 filed Jun. 24, 2005, the contents of both of which are incorporated herein by reference.

BACKGROUND

1. Technical Field

The present invention relates to the transfer of funds. More particularly, the present invention relates to an on-line payments facility.

2. Description of Related Art

There are currently several problems that make it difficult for individuals or small businesses to send money to or receive money from groups of individuals or businesses using an on-line interface to one or more payment systems. Prior art solutions tend to be too complex or too simple. Complex solutions require a detailed understanding of the underlying characteristics of individual payment systems for even minimal use. In addition, they fail to provide automatic response to exception conditions such as refused or returned payments.

Simple solutions allow for only a single payment to be made at a time, restrict the system to a single user per customer, have insufficient controls over release of payments, or fail to provide for explanatory information to accompany the payment.

It would be advantageous to provide a payment interface that was both simple and powerful; the automated the enrollment process; that supported multiple users per customer, with proper roles and financial controls; that hid the details of underlying payment systems and automatically routed payments to the appropriate system; that allowed the user to create, save, and schedule groups of payments, where those groups would be independent of grouping capabilities of underlying payment systems; that provided notification of important events to users and payment recipients; and that could automatically process and take proper action when it encountered exception conditions.

SUMMARY

An example embodiment relates to a computer system for processing employee direct payroll deposits. The computer system comprises computer-readable storage media having instructions stored therein and one or more processors executing the instructions stored in the computer-readable media to implement a counterparty management module and a payment module. The counterparty management module permits an employer to add employee bank accounts to a funds transfer system provided by a banking institution. The employee bank accounts are respectively associated with different employees of the employer. The employer has a bank account at the banking institution. The counterparty management module is accessible to the employer by way of an online banking area of a website of the banking institution. The counterparty management module provides screens to the employer by way of the Internet. The counterparty management module also permits the employer to specify, by providing responses to prompts contained in the screens, a payroll-related pay group that includes the employee bank accounts and to specify characteristics of the transferring of funds to the pay group as a whole, including a time by which the funds are to be transferred. The counterparty management module also permits the employer to specify, by providing responses to the prompts contained in the screens, bank account numbers for each of the employee bank accounts. The payment module generates payment instructions for transferring funds from the employer bank account to the employee bank accounts.

These aspects and features together with the various ancillary provisions and features which will become apparent to those skilled in the art from the following detailed description, are attained by the systems and methods described herein, preferred embodiments thereof being shown with reference to the accompanying drawings, by way of example only, wherein:

BRIEF DESCRIPTION OF THE DRAWINGS

FIG. 9 shows a first enrollment screen;

FIG. 10 shows a second enrollment screen;

FIG. 11 shows a screen for adding a Payee;

FIG. 12 shows a screen for forming a Pay Group;

FIG. 13 shows a first screen for scheduling payments;

FIG. 14 shows a second screen for scheduling payments;

FIG. 15 shows a third screen for scheduling one-time payment;

FIG. 16 shows a third screen for scheduling recurring payments;

FIG. 17 shows a screen of a user's error message; and

FIG. 18 shows a screen with an alert summary table for a customer.

Reference symbols are used in the Figures to indicate certain components, aspects or features shown therein, with reference symbols common to more than one Figure indicating like components, aspects or features shown therein.

DETAILED DESCRIPTION OF EXAMPLE EMBODIMENTS

Figure 1:
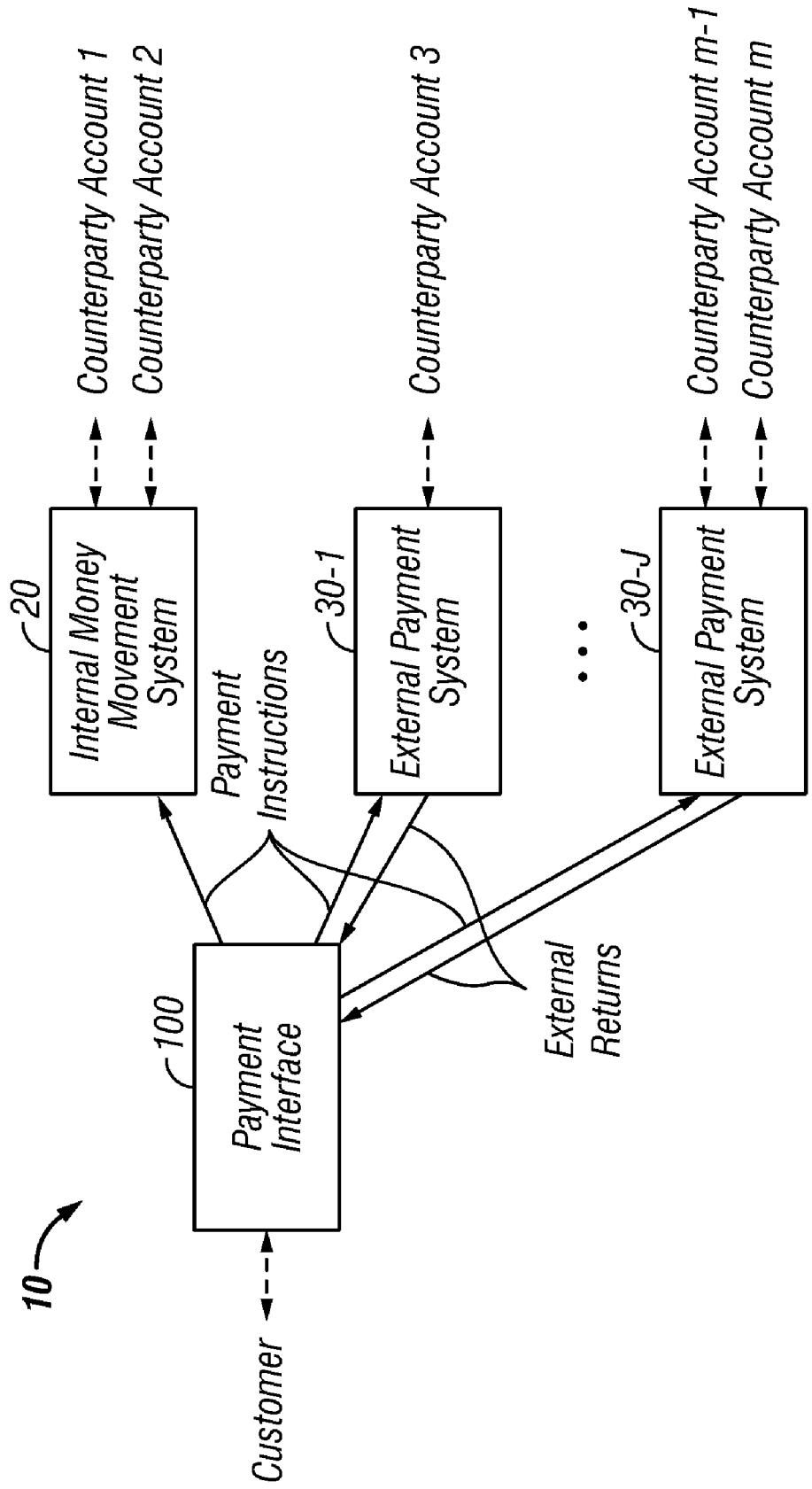
FIG. 1 is a schematic of one embodiment of a funds transfer system according to an example embodiment.

In general, the systems and methods described herein enable a customer to transfer funds between a customer's account and one or more counterparty accounts. One embodiment of a Payment Interface 100 of the present invention is shown, for illustrative purposes, in FIG. 1 as part of a payment transfer system 10 that permits a Customer to schedule payments with a number of counterparty accounts. In one embodiment, system 10 schedules payment transfers from a Customer account to a payee account. In another embodiment, system 10 schedules payment transfers from a payor account to a Customer account. The account that the Customer transfers to or from is referred to herein, without limitation, as a "non-customer," a "non-customer account, " a "Counterparty," or a "Counterparty Account." Counterparty accounts are indicated in FIG. 1, for example, as Counterparty Account 1 through Counterparty Account m. Payment Interface 100 may permit the scheduling of payment by the Customer to Counterparties, and/or the scheduling of debit originations by Counterparties to the Customer.

In one embodiment, Payment Interface 100 provides access to the only the Customer. In another embodiment, Payment Interface 100 provides shared access to lists of Counterparties via accounts with same identification number referred to herein, without limitation, as an "IDN" which includes, but is not limited to, a Tax Identification Number (TIN), an Employee Identification Number (EIN), or a Social Security Number (SSN). In another embodiment, Payment Interface 100 provides various levels of access for different roles or levels of access, such as an Owner, and Administrator, or a Delegate. The term "Customer" thus may include one or more individuals having different rights in accessing Payment Interface 100, as described subsequently. Payment Interface 100 also provides support for multi-user input-release-approve controls. In one embodiment, Payment Interface 100 is used to schedule deposits for a customer. Customer deposits may include, but are not limited to, payee paychecks, tax payments, and payments for services or goods on a recurring or one-time basis. In another embodiment, Payment Interface 100 is used to schedule debit origination into a Customer's account from a Counterparty Account on a recurring or one-time basis.

More specifically, Payment Interface 100 accepts instructions from the Customer for the transfer and/or scheduling of the transfer of funds between a Customer's account and a Counterparty having accounts at the same or different financial institution as the Customer account. The Customer's account that partakes in the transfer of funds, be it as payee or payer, is referred to herein and without limitation as the "funding account"). The Customer's funding account may be, for example, a deposit account having Customer's funds or a credit product against which the Customer may draw funds. In one embodiment, Payment Interface 100 has support for scheduling future transfers. In another embodiment, Payment Interface 100 has support for scheduling reoccurring transfers.

In general, Payment Interface 100 includes the architectural infra-structure for performing variety of payment products that may include, but not limited to, vendor payments, collections, transfers to other non-owned bank accounts, transfers between the bank and other financial institutions, state and federal tax payments, Automated Clearing House (ACH) payment types, wire transfers, real-time credit card authorizations and postings, and ATM transactions. In another embodiment, Payment Interface 100 also includes the architectural infra-structure for performing a transfer of funds from a Counterparty to the Customer by methods that include, but are not limited to, debit origination from the Counterparty to the funding account. In several of the embodiments, Payment Interface 100 is described as a system for a Customer to pay a Counterparty. It is to be understood that the invention is not so limited, and may also include a system for a Customer to initiate a debit for payment of the Customer by a Counterparty.

Counterparty accounts are categorized herein as being located either at the same financial institution as the Customer's funding account or at a different financial institution from the Customer's funding account. A Counterparty account at the same financial institution as the Customer's funding account is referred to herein as an "Internal Counterparty Account," or an "Internal Account," and a transfer between a Customer's funding account and an Internal Counterparty Account is an "Internal Funds Transfer." A Counterparty account at a different financial institution from the Customer's funding account is referred to herein as an "External Counterparty Account," or an "External Account," and a transfer between a Customer's funding account and an External Counterparty Account is referred to herein as an "External Funds Transfer."

As shown in FIG. 1, Payment transfer system 10 includes an Internal Money Movement System 20 and J External Payment Systems 30-1 through 30-J, and referred to, in general, as External Payment System 30. Payment transfer system 10, including Payment Interface 10 and Systems 20 and 30, include one or more computer components or systems including, but not limited to, processors, displays, data entry devices, and networking capabilities.

Payment Interface 100 allows a customer to schedule transfers with Counterparties by requesting the transfer of funds between a funding account, as indicated by the dashed arrow between the Customer and payment interface 100, and one or more Counterparties through Internal Money Movement System 20 and External Payment Systems 20. FIG. 1 shows, for illustrative purposes and without limitation, Internal Funds Transfers to Counterparty Accounts 1 and 2, an external transfer to Counterparty Account 3 through External Payment System 30-1, and external transfers to Counterparty Account m-1 and m through External Payment System 30-J.

In the embodiment of FIG. 1, Internal Money Movement System 20 includes a network that is internal to the Customer's financial institution, providing for the transfer of funds between customers of the Customer's financial institution. External Payment System 30 is a network that includes systems at the Counterparty's financial institution and may include other computers or networks that provide for clearinghouse functions.

In one embodiment, Payment Interface 100 supports transfers within a single country. Thus, for example, in the United States electronic deposits may be made using ACH or Fedwire services. In another embodiment, Payment Interface 100 supports transfers across national boundaries. Thus, for example, for a Customer having an account in a financial institution in the United States, electronic deposits may be made using foreign countries or banks that are supported by bank cross border ACH, or by SWIFT. Payment Interface 100 accepts the Customer's transfer request and determines the appropriate protocol for transferring funds and generates the appropriate commands for affecting the transfer, based, for example, on the type of accounts or the scheduling of the deposit or debit request.

Payment Interface 100 facilitates the use of system 10 by collecting scheduling information from the Customer, including Counterparty account information, in a manner that permits easy use by a Customer that is not familiar with the intricacies of the underlying funds transfer protocols. In one embodiment, Payment Interface 100 requires a Customer to provide the information including, but not limited to, account and routing numbers, that is then converted into the proper sequence of codes for a particular transfer protocol ("Payment Instructions," as indicated in FIG. 1). In another embodiment, there may be more than one protocol for transferring funds but the timing requirements of the request may limit the number of protocols that are available for a specific transfer. Payment Interface 100 determines which of the protocols are available given the Customer's constraints of the transfer, and further may select the protocol that satisfies the Customer's request at the lowest cost to the Customer. Payment Interface 100 also shields the Customer from having to be familiar with the transfer details. In one embodiment, Payment Interface 100 can accept a single comment from the Customer to direct funds to several Counterparties at different financial institutions and electronically deposit funds into their accounts using different transfer mechanisms without the Customers involvement. In another embodiment, Payment Interface 100 can accept a single comment from the Customer to affect a debit origination from several Counterparties at different financial institutions and electronically transfer funds to the Customer's funding account using different transfer mechanisms without the Customers involvement.

In one alternative embodiment, Payment Interface 100 includes the ability for automatically enrolling a Customer for using the Payment Interface and permitting the Customer to transfer funds immediately after enrolling. In another alternative embodiment, Payment Interface 100 includes the ability to allow the Customer to schedule future transfers with Counterparty accounts.

In yet another alternative embodiment, Payment Interface 100 includes the ability to handle exceptions, such as returns, from external payment systems and provide the Customer with suggested changes to the transfer request. External funds transfers are not possible under some circumstances. For example, the payment instructions are incorrect in some detail or the External Account no longer exists. In such cases, a message will be sent back to the Customer's financial institution, as an exception from external systems as indicated by the arrows labeled "Exceptions" in FIG. 1. Payment Interface 100 includes a mechanism to receive the Exceptions and to provide alerts to inform the Customer of the failure of the transfer. In some embodiments, the Customer is also prompted to supply information that might have been missing and to resubmit the deposit request.

Figure 2:
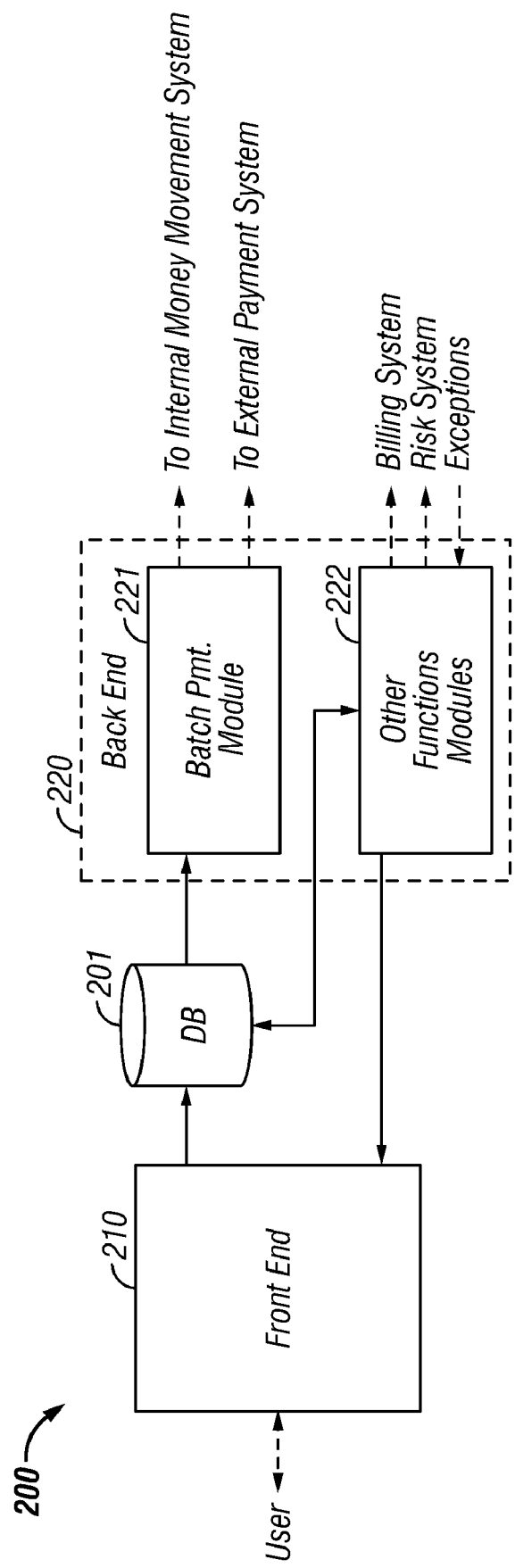
FIG. 2 is a schematic of a first embodiment payment interface according to an example embodiment.

FIG. 2 is a schematic of a first embodiment Payment Interface 200. Payment Interface 200 may be generally similar to Payment Interface 100, except as further detailed below. Payment Interface 200 includes a Front End 210, a Database (DB) 201, and a Back End 220, which further includes a Batch Payment Module 221, and an Other Functions Module 222. The functions of the various components of Payment Interface 200 may be performed in one computer processor or in a networked environment. Front end 210 is configured to exchange information with a User as indicated by the dashed arrows on the left side of the Figure. The User may be, for example, the Customer of the embodiment of FIG. 1, or a banker of the Customer's financial institution.

Database 201 contains information for facilitating and tracking transfers, including, but not limited to, the Customer's account balances and the information provide by the Customer. This information is used, for example, in ensuring the transfers are handled properly and for quality control and billing. In particular, the information in Database 201 includes, but is not limited to, information required by the receiving financial institution system to affect a transfer, to bill the Customer for instituting the transfer, for analysis of the transfers to detect risks to the financial institution, and to receive information from external transfers indicating a failed transfer of funds. The information in Database 201 is available to Front End 210, Batch Payment Module 221, and Other Functions Module 222.

As described subsequently, various embodiments of system 200 include, but are not limited to, enrolling a user for use of the system, accepting funds transfer scheduling information including, but not limited to, counterparty account information, the amount of funds to be transferred, and the timing of the transfer, and providing information to the Customer regarding the status of or problems with the transfer. Requests from the Customer are provided to Front End 210.

Most financial instructions handle external transfers on a set schedule, for example, once per day after the close of business in a batch process. Instructions to perform a transfer on or after the next batch processing time are directed to Batch Payment Module 221 which then determines how the funds are to be transferred and generates the proper sequence of instructions to provide to Internal Money Movement System 20 or External Payment System 30. Batch Payment Module 221 decides how to transfer funds according to the location and type of account being deposited to, and the cost of any alternative transfer choices.

Other Functions Module 222 provides information for billing and risk systems, and received Exceptions information, as described subsequently. Example of Customer billing may include, but are not limited to, Customer billing on both a monthly and per transaction tiered basis supporting waivers, promotion codes, and fee codes with charges being directed both directly to Customer indicated accounts and to analysis.

Figure 3:
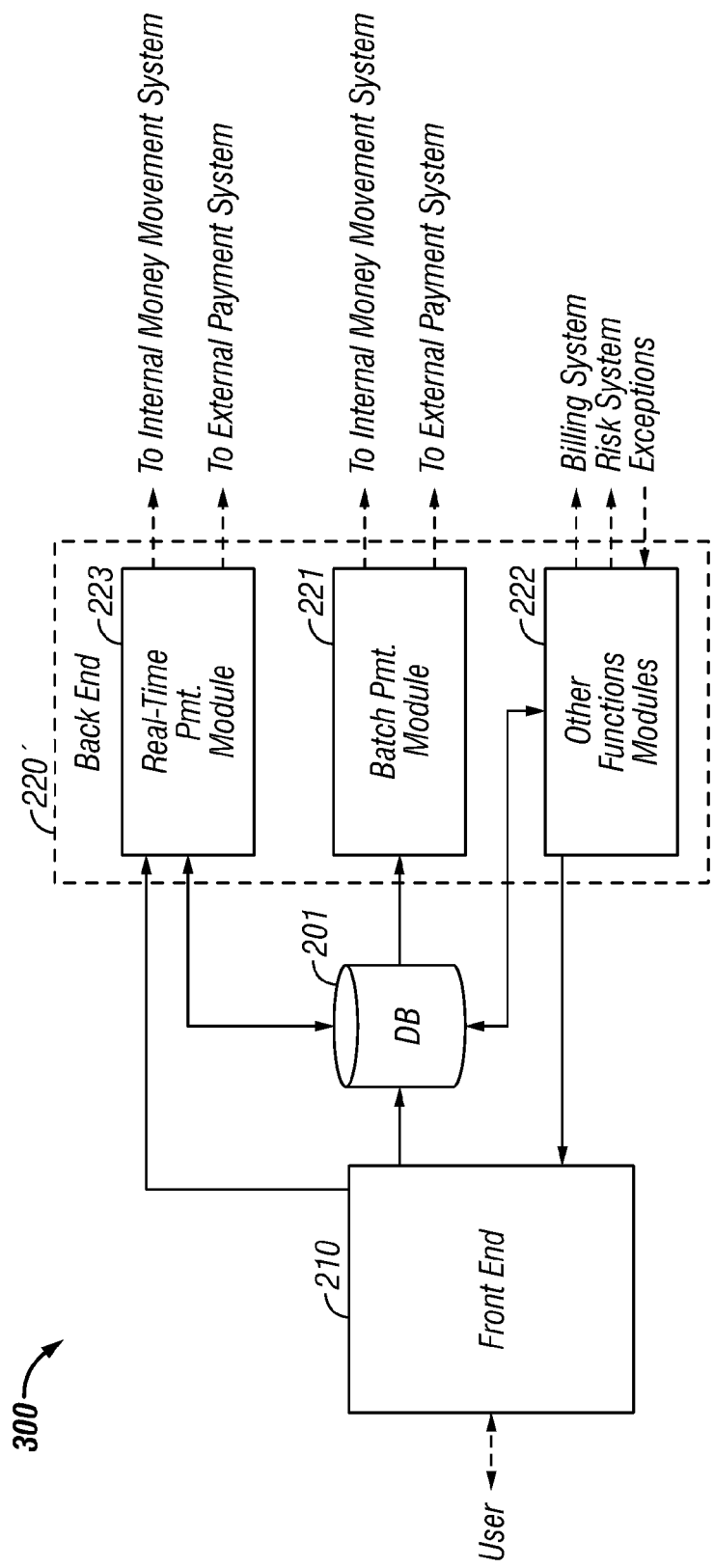
FIG. 3 is a schematic of a second embodiment payment interface according to an example embodiment.

FIG. 3 is a schematic of a second embodiment Payment Interface 300. Payment Interface 300 may be generally similar to Payment Interfaces 100 or 200 except as further detailed below. Payment Interface 300 includes a Front End 210' and a Back End 220' having a Real-Time Payment Module 223. In contrast to Front End 210, Front End 210' is able to process transfers that are requested by the Customer to take place before the before the next batch processing event. Specifically, Front End 210' determines if the requested transfer takes place before the next batch processing event, and provides the transfer information to Real-Time Payment Module 223, which then determines how the funds are to be transferred and generates the proper sequence of instructions to provide to Internal Money Movement System 20 or External Payment System 30. Real-Time Payment Module 223 decides how to transfer funds according to the location and type of accounts between which funds are transferred, and the cost of any alternative transfer choices.

Figure 4:
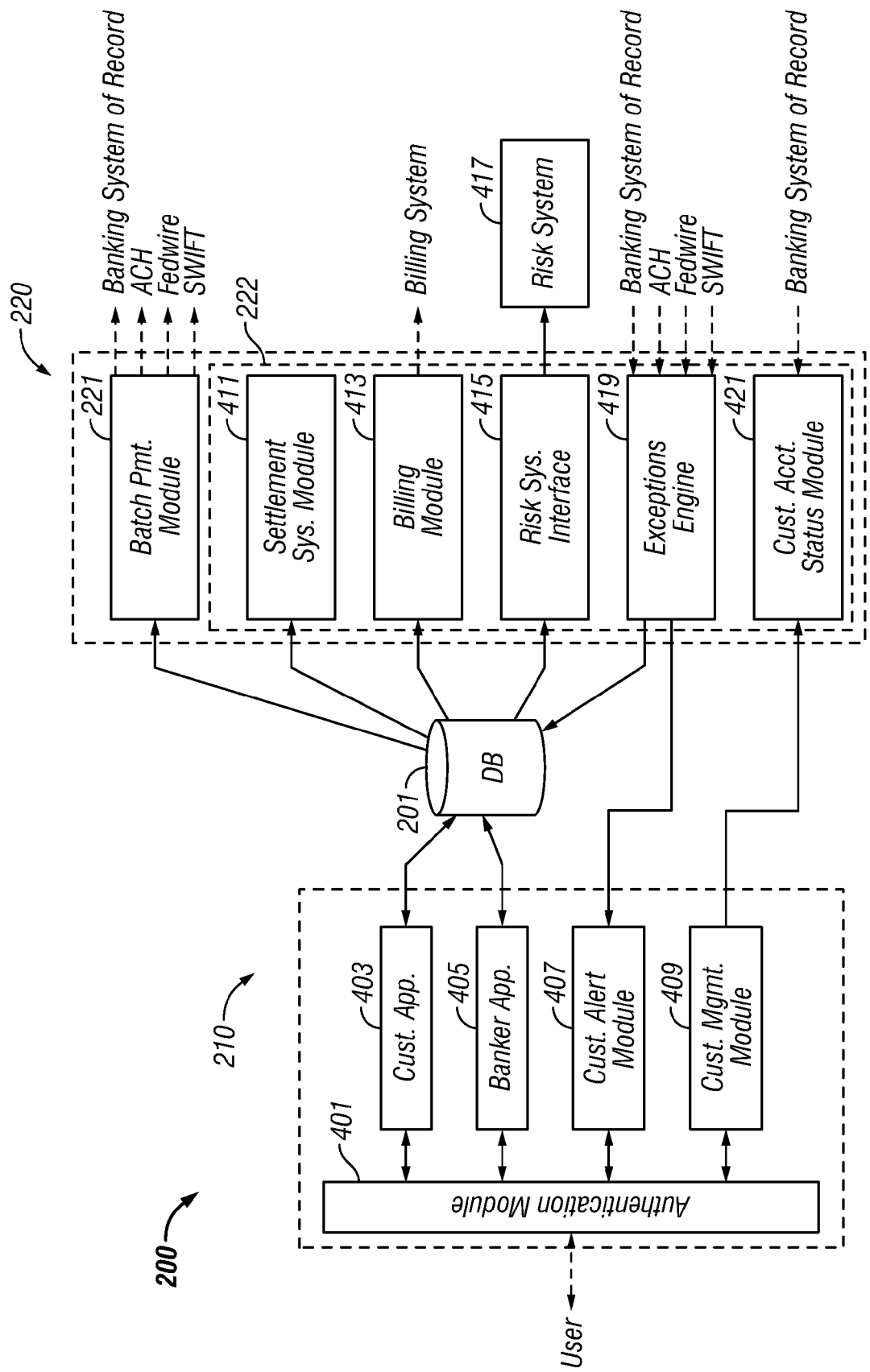
FIG. 4 is a schematic of one embodiment of the payment interface of FIG. 2.

FIGS. 4-7 are schematics showing more detail of Payment Interfaces 200/300. With reference to FIG. 4, which shows detail of Payment Interface 200, Front End 210 includes an Authentication Module 401 that is in communications with a Customer Application Module 403, a Banker Application Module 405, a Customer Alter Module 407, and a Customer Management Module 409. Other Functions Modules 222 include a Settlement System Module 411, a Billing Module 413, a Risk System Interface 415 and a Risk System 417, an Exceptions Engine 419, and a Customer Account Status Module 421. Database 201 is in communications with Customer Application Module 403, Banker Application Module 405, Settlement System Module 411, Billing Module 413, Risk System Interface 415, and Exceptions Engine 419. Customer Alert Module 407 is in communications with Exceptions Engine 419, and Customer Account Status Module 421 is in communications with Customer Management Module 409.

A User, such as a Customer or a banker, accesses Payment Interface 200 by communications with Authentication Module 401. Thus, for example, a User connects either directly to a computer performing the function of Authentication Module 401, or connects over a network, including but not limited to the Internet. The identify and authority of the User to communicate with the other components of Payment Interface 200 are verified, for example, by verifying a User's password upon first use or when sensitive actions are requested, such as transferring funds. Authentication Module 401 may request a higher level of authorization for sensitive actions. After verification of the User's status, Authentication Module 401 permits the User to access Customer Application Module 403, Banker Application Module 405, Customer Alter Module 407, and/or Customer Management Module 409, as appropriate to the User's status.

Figure 5:
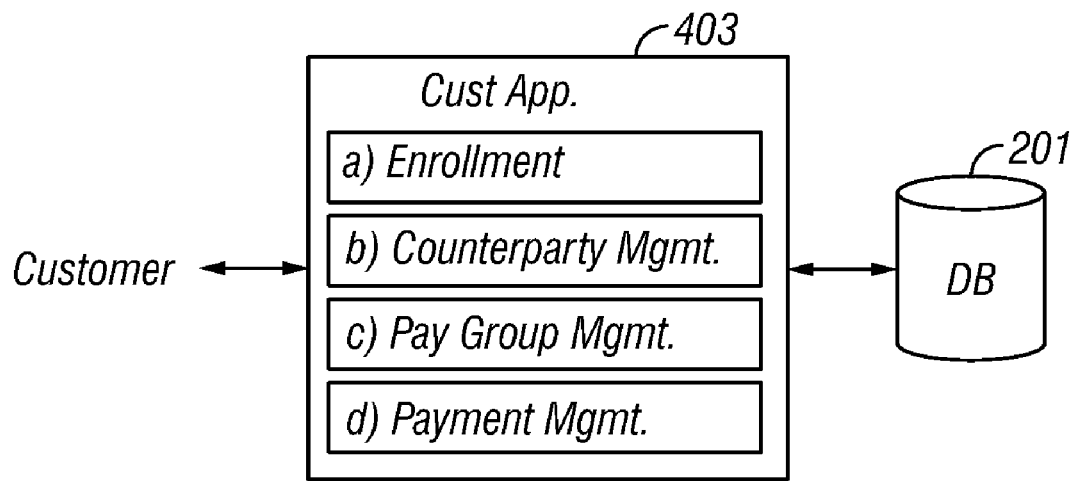
FIG. 5 is a schematic illustrating one embodiment of a customer application module according to an example embodiment.

Customer Application Module 403 performs many functions, such as collecting Customer and Counterparty account information, scheduling payments to Counterparties, and optionally scheduling debit origination requests from Counterparties to the Customer. One embodiment of Customer Application Module 403 is shown in FIG. 5 as including an Enrollment Module 403a, a Counterparty Management Module 403b, a Pay Group Management Module 403c, and a Payment Management Module 403d. Customer Application Module 403 prompts the Customer for information that is used to schedule transfers to Pay Groups. For security reasons, a Customer's own account numbers are not displayed in its entirety.

Enrollment Module 403a prompts a Customer to enter information related to, but not limited to, selection of an account for funding deposits to, or receiving funds from, Counterparty accounts and a billing account for payment of fees associated with use of the Payment Interface 200 and one or more email addresses to send messages indicating that some action may be required of the Customer to correct errors in the transfer of funds. Additional information entered into Enrollment Module 403a includes, but is not limited to, verification of Customer and Counterparty accounts and e-mail addresses and acceptance of an enrollment agreement for use of Payment Interface 200 require action.

Counterparty Management Module 403b prompts the Customer to enter information related to individual Counterparties. The individual Counterparty information may include, but is not limited to, the Counterparty's name and account information, such as routing number, account number, and account type, such as whether the account is a checking or savings account. Optional information entered into Counterparty Management Module 403b includes a Counterparty identification number and an e-mail address to provide the Counterparty with notification of payment. Counterparty Management Module 403b prompts and accepts information by permitting the Customer to add or delete a Counterparty, or to change Counterparty information.

Pay Group Management Module 403c prompts the Customer to enter groups of Counterparties. Pay Groups are one or more individual Counterparties whose transfers occur at the same time. Thus, for example, the group of Counterparties paid weekly or a group of contractors paid monthly. Pay Group Management Module 403c presents a list of individual Counterparties and allows the Customer to group the individual Counterparties into a Pay Group by adding, deleting, or editing individual Counterparties to or from particular Pay Group.

Payment Management Module 403d prompts the Customer to manage transfers by Pay Groups by adding, deleting, or editing transfers to Pay Groups. Information provided to Payment Management Module 403d includes, but is not limited to, the selection of a Pay Group and a transfer occurrence, be it a single or recurring transfer, the selection of Counterparties from a Pay Group, selecting a pay date and a send date. Examples of transfer occurrence include, but are not limited to weekly, every other week, twice a month, and monthly payments.

Payment Management Module 403d also displays the total transfer amount and funding account balance. Payment Management Module 403d prompts the Customer to provide optional information, including but not limited to a description to provide on the Customer's statement and a description to provide to the Counterparty in an e-mail notification of payment.

Figure 6:
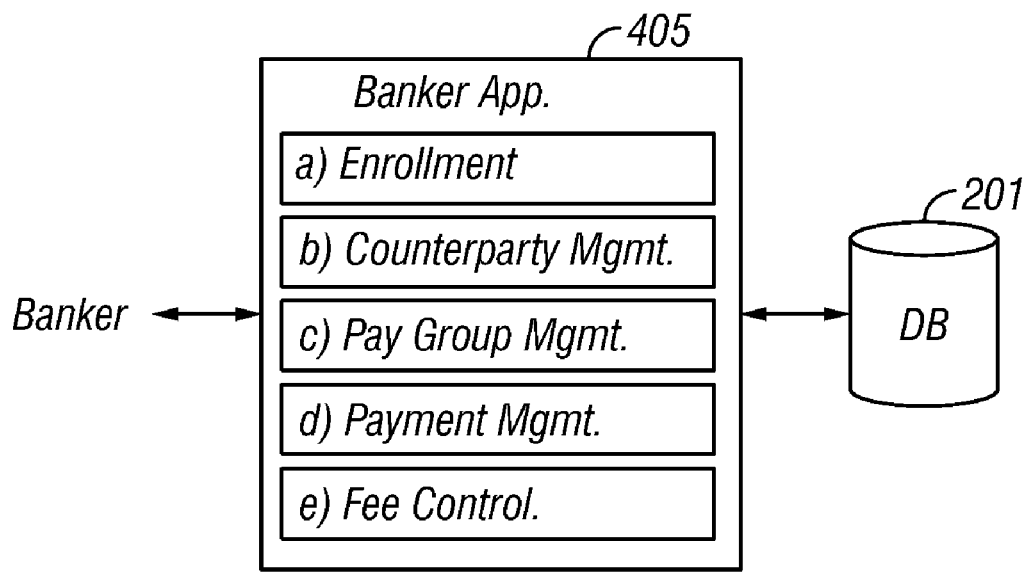
FIG. 6 is a schematic illustrating one embodiment of a banker application module according to an example embodiment.

Banker Application Module 405 is similar to Customer Applications Module 403. One embodiment Banker Application Module 405 is shown in FIG. 6 as including an Enrollment Module 405a, a Counterparty Management Module 405b, a Pay Group Management Module 405c, and a Payment Management Module 405d. Banker Application Module 405 also includes a Fee Control Module 405e. Banker Application Module 405 is similar to Customer Application Module 303 except that in the banker modules all digits of account numbers are displayed and Counterparties cannot be created. In one embodiment, the Banker Application Module 405 cannot release funds. In an alternative embodiment, the Banker Application Module 405 can release funds. Fee Control Module 405e allows the person logged onto Banker Application Module 405 to waive use fees for Payment Interface 100 for a period of time.

Customer Alter Module 407 is a message center to provide the Customer with messages related to failed transfer attempts with external financial institutions that require prompt attention.

Customer Management Module 409 is in communication with Customer Account Status Module 421, which is in communication with the Banking System of Record. Customer Management Module 409 allows the Customer to add, delete or edit information related to those that have access to the Customer account. Thus, for example, a Customer may be the owner, delegate or authorized signer on the Customer account. Module 409 provides entitlement to Payment Interface 100.

Database 201 contains all information provided by Customer Applications Module 403, Banker Applications Module 405, and Exceptions Engine 419, and Customer account balances, and provides information to Batch Payment Module 211, Settlement System Module 411, Billing Module 413, and Risk Sys Interface 414.

Batch Payment Module 211 is run at regular intervals to assemble transfer information from Database 201 and transfer funds in a batch mode. Batch Payment Module 211 assembles the scheduled payments and determines out how to correctly route the transfer based on Counterparty characteristics. Counterparty characteristics include, for example, whether the transfers are internal or external transfers and may include whether the Counterparty is a company or individual, the location of the Counterparty, and a currency if the Counterparty account is in a currency different than the Customer account.

In one embodiment, Batch Payment Module 211 includes an internal mapping of the various transfer protocols, such as an internal transfer, ACH, Fedwire, and SWIFT, the internal logic to assemble valid codes for the protocols based on the Counterparty characteristics, and the ability to transmit the valid codes to the appropriate Internal Money Movement System 20 or External Payment System 30. If the Counterparty has an Internal Account, for example, the account number and deposit amount is provided to the banking system of record. If the Counterparty has an External Account, then the routing and account number, as well as additional information, may be required for supplying to the appropriate External Payment System 30. Thus, for example, transfers within the U.S. may be made by a Fedwire or an ACH transfer. ACH transfers require knowledge of whether the Counterparty account is a company or an individual, while Fedwire transfers do not. Transfers to foreign countries can be accomplished using SWIFT, and the transfers must also indicate the currency of the deposit. Batch Payment Module 221 determines which system to use, assembles the proper codes, and transmits them to the appropriate transfer system, without Customer intervention.

Settlement System Module 411 accepts information from Database 201 regarding internal transfers and settles accounts involved in the internal transfer of funds.

Billing Module 413 accepts information from Database 201 and assembles a list of all transfers by a Customer and sends billing information to a Billing System for payment processing. The amount billed may depend on the cost of performing the transaction and premiums for faster service.

Risk System Interface 415 accepts information from Database 201 and provides reports to Risk System 136.

Customer Account Status Module 421 accepts information from the Banking System of Record and from Customer Management Module 409 to keep track of Customer status.

Payment Interface 200 allows a Customer to enroll and transfer funds, such as to or from the funding account, with Counterparty accounts immediately upon enrolling. The Customer is provided with a password for using Payment Interface 200, supplies the Interface with account information: Customer funding and fee payment account information, details on Counterparty accounts, the forming of Pay Groups, and the scheduling of funds transfers to Counterparties in Pay Group. Payment Interface 200 further automates payments to Customers and shields the Customer from the details of the actual transfer mechanism. Thus, for example, Batch Payment Module 221 selects a transfer method (such as internal, ACH, Fedwire or SWIFT) based on cost, time and geographical constraints and formulates the proper set of codes for use of the selected transfer method.

Payment Interface 200 also interprets errors from failed transfers, such as failed ACH transfers and provides the Customer with information on how to change Counterparty information to make the transfer occur on a next try. As one example of error handling, consider the failed attempt to transfer funds using ACH. When transfers are not completed due to errors in ACH codes or changes in Counterparty actions, ACH sends a message back to the originating financial institution. These messages, which are coded, are accepted and interpreted by Exceptions Engine 419, which then stores the information in Database 201 and provides the Customer with a message accessible through Customer Alter Module 407. One type of error is a Notification of Change. These errors are generally fixable by the Customer. Exceptions Engine 419 will provide the Customer with recommended actions to correct the error indicated by the Notification of Change and report this to Customer Alter Module 407. In one embodiment, Payment Interface 100 will follow up at a later time to see if the Customer has corrected the problem. Another type of error is a Return. These errors are generally not fixable, and Exceptions Engine 419 will deactivate the Counterparty to keep the error from occurring in the future. Exceptions Engine 419 modifies status of the Counterparty (that is whether the Counterparty is active or inactive, and indicates if funds should be returned to the Customer. Payment transfer system 10 is a "good funds system" that collects funds into a clearing account, and then pays from the clearing account).

Payment Interface 200 receives information on transfer failures and returns funds to the Customer, maintains internal mapping of failures from different transfer systems, provides an indication to the Customer of the failures, and suggests changes to prevent future failures. Payment Interface 200 also inactivates a Counterparty if the failure results in a monetary return and checks to see if the Customer changes suggested items before making active again.

Figure 7:
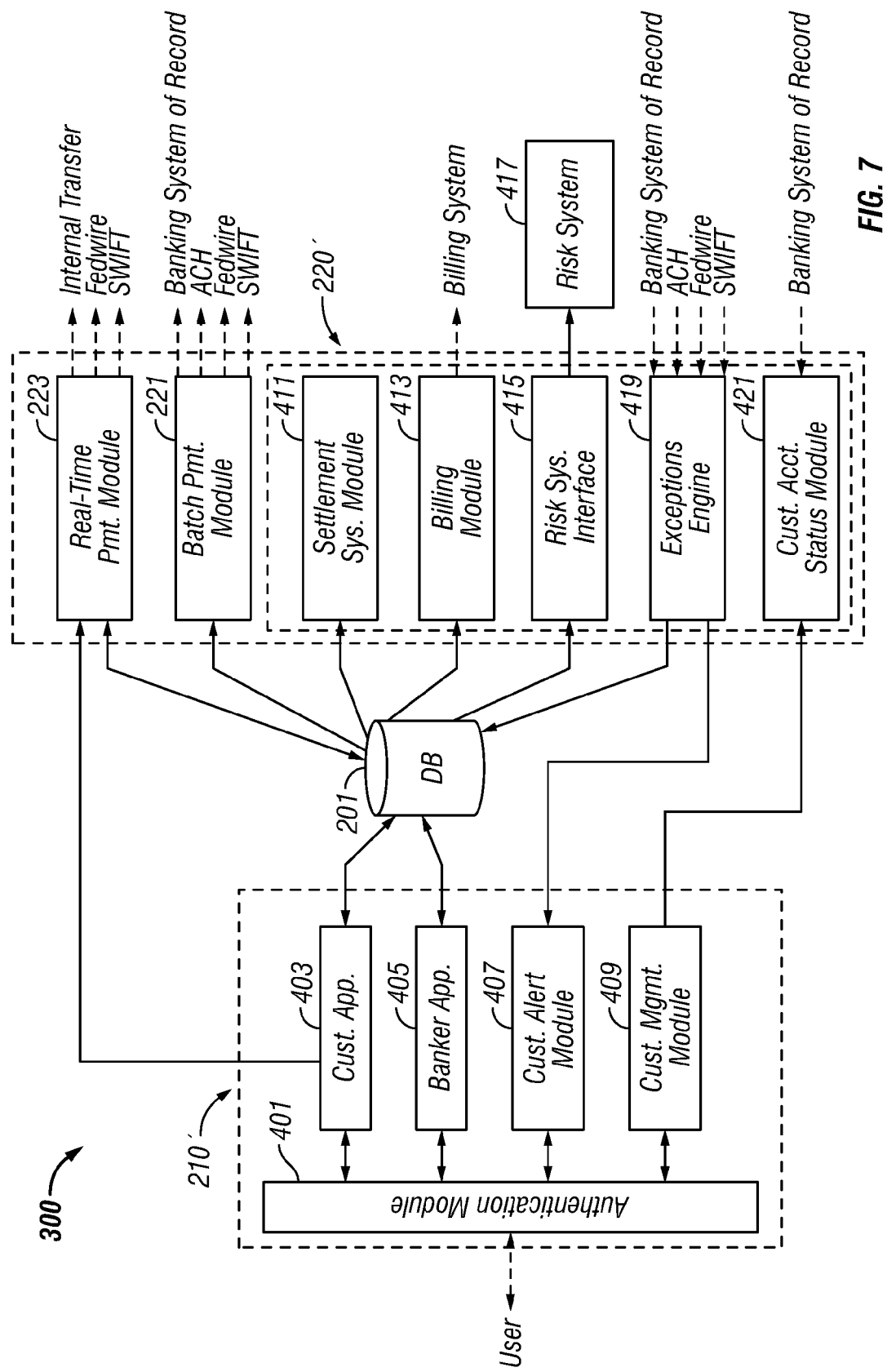
FIG. 7 is a schematic of one embodiment of the payment interface of FIG. 3.

FIG. 7 is a schematic showing more detail of Payment Interface 300. Payment Interface 300 includes the modules, interfaces and systems of Payment Interface 200, and also permits the real-time transfer of funds. In particular, Front End 210' accepts the scheduling of transfers before the next batch processing time, and Back End 220' includes Real-Time Payment Module 223 that accepts funds transfer information from Customer Applications Module 403' and interchanges information with Database 201.

Customer Applications Module 403' determines if a scheduled transfer must be made in real-time (that is, before the next scheduled batch process) and provides the transfer information to Real-Time Payment Module 223. Real-Time Payment Module 223 is similar to Batch Payment Module 221 in that it determines which protocol to use to transfer the funds, generates the proper codes, and provides the transfer codes to the transfer system. Information on the transfer is provided to Database 201 by Real-Time Payment Module 223.

Payment Interface 100 is capable of providing a powerful user interface for performing various financial transactions. The following are examples of features and functionality of specific embodiments that can be incorporated Payment Interface 100, individually or in combination:

Permitting the payment of Counterparty Accounts from a Customer's funding account.

Permitting the request of a payment from at Counterparty Account to a Customer's funding account via debit origination.

Providing shared access to Counterparty /payment lists or groups, maintenance, alerts, users, and history by Customer's by enrolled IDN.

Permitting an individual to enroll in multiple IDN's and select between them without sharing data or access across enrolled IDN's.

Providing a limitation of which functions are available to a user based on role and administrator granted access levels.

Providing access to a company's Counterparty /payment lists, maintenance functions, alerts, and history are available to Internal Counterparties with access to accounts and Pay Groups within the enrolled IDN.

Providing a memo credit for deposits to Internal Counterparties.

Providing the Customer with the ability and responsibility for enrolling Counterparties, including providing associated Counterparty approval documentation and correct input of full account numbers including transit routing and country codes.

Determining if all possible or reasonable edits for deposit instructions eliminate or reduce ACH rejections or errors, including real-time verification of Internal Accounts and other financial institutions transit routing numbers.

Allowing the Customer to establish, store, and maintain a master lists of Counterparties. The Counterparty information may include, but is not limited to: Counterparty name; identification number; and primary and secondary account information including: routing and account numbers, account type (checking or savings), normal payment amount, country code for international payments, e-mail address.

Providing the ability for a Customer to send an automatic generic email notice to a Counterparty when a deposit has been made, and allowing the Customer to store or include a company name in an e-mail message.

Permitting Customers to assign, store, or maintain Counterparties in different Payment groups or categories (weekly, monthly, part time, etc).

Permitting Counterparties to be listed in multiple Pay Groups.

Permitting notification by e-mail for each payroll released, where the enrolled owners/signers of the IDN will be notified by email when the payroll is submitted/released. When funding account is memo debited with date of credits posting, and When any rejects or returns occur Obtaining and processing any rejects or returns through out the day.

The following is an example embodiment which is not meant to limit the scope of the invention.

User Access Rules and Administration

The following is one embodiment of user access rules and administration that may be incorporated Payment Interfaces 100/200/300.

In one embodiment, there are 4 user levels (or roles): Administrator, Owner/Signer, Delegate, and Superuser. Each user must have access to at least one funding account with the enrolled TIN. Owners are automatically enrolled as Administrator-Owners and cannot be demoted. Administrators can control Pay Group Access for all users, and any user may create a pay group. The initial default access will be determined by the user's role.

The Administrator must be an individual with, and can only be an Owner or Signer, and can never be a Delegate. An Administrator may assign other administrators, which each have access to all Payment Interface 100/200/300 functions including, but not limited to, control of: all user access to the Payment Interface; all user access to Pay Groups; funding account access; and input/edit and review/approve power for all non-owners.

There are three levels of Administrator: Administrator—Customer Information System (CIS) identified Owner; Administrator—Signer; and Administrator—Online Customer Service (OCS) identified Owner. The Administrator—CIS identified Owner is a user that is identified as an owner by the banking system of record. The Administrator—CIS identified Owner can override all non-owner administrators and cannot be demoted or removed by another Administrator. If no banking system of record owner exists for the Customer Tax ID, then the $1^{st}$ signer to enroll is granted Administer powers as an Administrator-Signer. If either the Administrator—CIS identified Owner or Administrator—Signer assign administrator authority to another signer, then they are all treated as equal administrators. If no CIS owner exists for the Customer Tax ID, then the OCS can assign owner status. Once assigned, has the same power within the Payment Interface as a CIS-identified owner.

An Owner/Signer must have access to at least one funding account with an enrolled TI. A Signer is a non-Owner has privileges granted by an Administer and does not have access to Administrator functions unless granted such access by an Administrator.

A Delegate must have a banking system of record view only access to at least one funding account having an enrolled TIN. The Delegate has access granted by an Administrator, can only input or edit information, can view online reports only for pay groups/funding accounts that they have been granted access. Delegates cannot view or select funding accounts for pay groups. Delegates can receive delegate level alerts.

A Superuser Has all powers of a CIS identified Owner-Administrator plus have: Full access to owner level admin functions; access to all users, funding accounts, and paygroups for TIN; and can view, search, or report on all accounts, users, transactions, and pay groups for an enrolled company. When no banking system of record Owner is identified, the Superuser can, at customer's request, perform a verification to identify "owner or principal". Once manually verified, can assign owner access to the requesting signer. There are two levels of levels of access for OCS: bankers and supervisors.

Initially enroll the enrollee as the first Administrator. An Administrator must grant access to each signer or delegate before they obtain access to Payment Interface 100/200/300. The Administrator controls user access, Pay Group access, input/edit and review/approval powers. The Administrator will see a list of all users having internal accounts linked to the customer TIN and their release code (owner, signer, signer delegate), and be able to include/exclude specific users from to Payment Interface 100/200/300. When a user is added to Payment Interface 100/200/300, the user will be notified by email or alert inbox.

Multi-user input-release-approve controls provide the capability for an administrator to enable or disable input-release-approve control of Pay Groups. If an Owner sets an include or exclude power for a user, delegate, or account, then the access level can only be changed by another owner. The input, change, or submission by delegated users always require secondary approval by a user with approval powers.

Navigation to the Payment Interface

Customers and delegates who have a previous relationship to a financial institution, through an Online Banking (OB) system of the financial institution, navigate to Payment Interface 100 through the Internet from links(s) on the an Online Banking Site Map. Bankers will navigate to Payment Interface 100 from a link within the banks internal banking system. Payment Interface 100 opens in a new browser window for bankers, but not for Customers and delegates. A new browser window opens each time a banker clicks on the link on the internal banking system—i.e. a banker can have multiple Payment Interface sessions open. When a banker navigates to an IDN or Username Search screen, any session open in that browser can be closed (e.g. if the banker was logged on, on behalf of a specific Customer). When a Customer or delegate navigates to the Payment Interface 100, his linked account(s) will have been previously through the Online Banking validation process. When a banker navigates to Payment Interface 100 on behalf of a specific Customer, a pseudo sign-on process will need to occur which will validate the Customer's relationship to the accounts, the account's status, etc., just as though the Customer were signing on to Online Banking Bankers can also sign on to Payment Interface 100 without signing on as a specific Customer.

Enrollment

Enrollment in Payment Interface 100 is by IDN. Enrollment is accomplished by an OB Customer (i.e. customer as determined by the consumer flag in an OB system) who has online access to an account for that IDN that is "valid" to be a Payment Interface 100 funding account. "Valid" accounts are defined in Online Banking tables that specify the rules for which account types, statuses, etc. are valid for specific online functions. These tables also specify which accounts are valid to be a billing account.

Delegates cannot enroll an IDN. A banker can do a partial enrollment on behalf of a Customer but the enrollment is not complete until the Customer accepts the Payment Interface 100 agreement. The Customer process for this acceptance to complete the enrollment is referred to as "Activation." The Customer who enrolls the IDN automatically has access to Payment Interface 100 functionality for the IDN. Through a batch process all other Customers and delegates who have online access to the funding account selected for the IDN by the enrollee will be added to the Payment Interface 100 database for the IDN, but this process does not give them access to Payment Interface 100. Owners of the funding account for an enrolled IDN will be given access to Payment Interface 100 upon navigation to DP for that IDN and do not have to wait for the batch process to add them to the Payment Interface. Signers and delegates will not get access until they have been added to Payment Interface 100 for the IDN via batch and then given access by a user with the appropriate authority. All functionality and screens within Payment Interface 100 are by IDN.

Once enrolled, an IDN's status is "Active" by default but can be changed to Closed or Frozen. An IDN can be closed online by a banker, or because of conditions detected in batch. An IDN's status will be set to "Frozen" if batch processing detects either of the following: the IDN's funding account is no longer valid; or there is no user remaining in Payment Interface 100 who has Input/Release/Control access. Payments for IDN's with a frozen status will not be processed unless/until the "problem" is fixed.

User, Roles, and Access Levels

Payment Interface ("PI") 100 can be accessed by Customers, delegates or bankers (an online customer service representative, or OCS), where are referred to herein as "users." The term "Customer" includes owners and signers and refers to a bank customer, as distinguished from a delegate. A banker can log on to Payment Interface 100 on behalf of a specific customer, but not on behalf of a delegate, or just as a banker. Table 1 is a listing of User's access levels, Table 2 is a listing of Banker's access levels, and Table 3 is a listing User and Banker access permissions.

TABLE 1

User's Access Levels

| User's Relationship to the PI the funding account for the enrolled IDN | Possible IP Access Levels | Comments |
| --- | --- | --- |
| Owner | Input/Release/Control | When a Customer who has been identified as an owner of the funding account for the enrolled IDN navigates to the IP, either for enrolling the IDN or for an IDN that is already enrolled, he is automatically given Input/Release/Control Access and this cannot be changed as long as the Customer remains an owner of the funding account. |
| Signer | Input/Release/Control Input/Release Input No Access | If the individual who enrolls an IDN is a signer, he is given Input/Release/Control access. All subsequent signers default to No Access. |
| Delegate (granted access to the funding account by an administrator) | Input Input/Release No Access | Defaults to No Access. |

TABLE 2

Banker's Access Levels

| Banker logged on as | Access Level |
| --- | --- |
| Banker-as-banker | NA-rules are specified in the requirements for each individual screen. |
| Banker-as-customer (a banker can log-on on behalf of a Customer but not on behalf of a delegate) | Same as the access level of the user on whose behalf the banker is signed on, except that the banker cannot perform some functions-rules are specified in the requirements for each individual screen. |

TABLE 3

Access Level Permissions

| Access Level | Can do |
| --- | --- |
| Customers and Delegates | |
| No Access | Nothing, unless and until his access level is upgraded. |
| Input (often referred to as Input Only) | Input any kind of data, including adding/changing Counterparties, creating/modifying/deleting payments. |
| Input/Release | All authorities attached to Input access, and can approve payments that were created or modified by a user with Input only |

TABLE 3-continued

Access Level Permissions

| Access Level | Can do |
|---|---|
| Input/Release/Control | access. If a user with Input/Release access creates or modifies a payment, approval is assumed. All authorities attached to Input/Release access, plus has what are sometimes referred to as "admin" authorities, which include, but are not limited to, being able to do the following for other users: change the access levels (except the access level of owners) change whether the user is to receive alerts (can also change for self) |
| | Bankers |
| Supervisor | There are some functions that only a supervisor can perform. Examples: expanded waiver functionality releasing/editing payment adding/editing Counterparties |
| non-Supervisor | |

Payments

Information regarding payments is created and maintained online, for example in Database 201. The actual sending of the payments to, or initiating debit origination from, the Counterparties is either a batch process, as preformed for example by Batch Payment Module 221, as is a real-time process, as performed for example by Real-Time Payment Module 223.

When a payment is created, the user designates it as a one-time payment or a recurring payment. One-time payments occur once based on a user-specified date. Recurring payments are set up to occur on a specified frequency (e.g. once a week, twice a month, etc.) within a specified range of dates. For example, a recurring payment may be set up for the last day of every month between Jan. 1, 2004 and Dec. 31, 2004.

The "pay date" is the date on which the user would like the Counterparties to be paid. However, financial institutions cannot guarantee payment on a specific date using some transfer mechanisms, such as ACH. The send date is the date on which the payment will be sent to ACH and on to the Counterparty's financial institution. The send date is calculated based on the pay date and the one or two days send option that the user selected when creating the payment. On the send date, prior to sending the file to ACH, the funds for the payment are debited from the funding account.

Pay dates and send dates must be business days. When creating a one-time payment the user must select a pay date that is a business day. For recurring payments, if an occurrence of the payment falls on a non-business day it is systematically adjusted to the prior business day. For recurring payments where the payment pattern is Monthly or Twice a Month, if a pay on date of 29, 30, or 31 was selected, for months in which that date does not exist treat it as though the user had selected the last day that does exist in that month. For example, if the user's selection is to pay on the 30th of every month January through August, the February payment will be adjusted to the 28th (assuming not a leap year).

The send date corresponding to a pay date is calculated as follows. A one business day option has a send date that is one business day prior to the pay date. A two business day option has a send date that is two business days prior to the pay date.

A cutoff date/time is the date and time that the batch process to process payments with a send date of today will begin. After this time the user cannot make any modifications to the payment. The system needs to support separate cutoff times for the one day and two day send options, although for the initial implementation they are expected to be at the same time.

When batch processing occurs on a payment's send date, the batch process assigns the payment a Transaction ID (with some exceptions such as the payment was never approved). This Transaction ID is used as a reference number for the transaction to debit the funding account. When the transactions are generated to pay the individual Counterparties (assuming the funding account was successfully debited), the batch process generates a separate Transaction ID for the payment for each Counterparty. There will be a Transaction ID associated with the overall payment which will be an identification number generated for the transaction to debit the funding account, and there will also be a Transaction ID associated with the payment to each individual Counterparty. In addition, in cases where a payment to a Counterparty is returned by their financial institution, another Transaction ID is generated for the transactions to put the funds back into the funding account.

Figure 8:
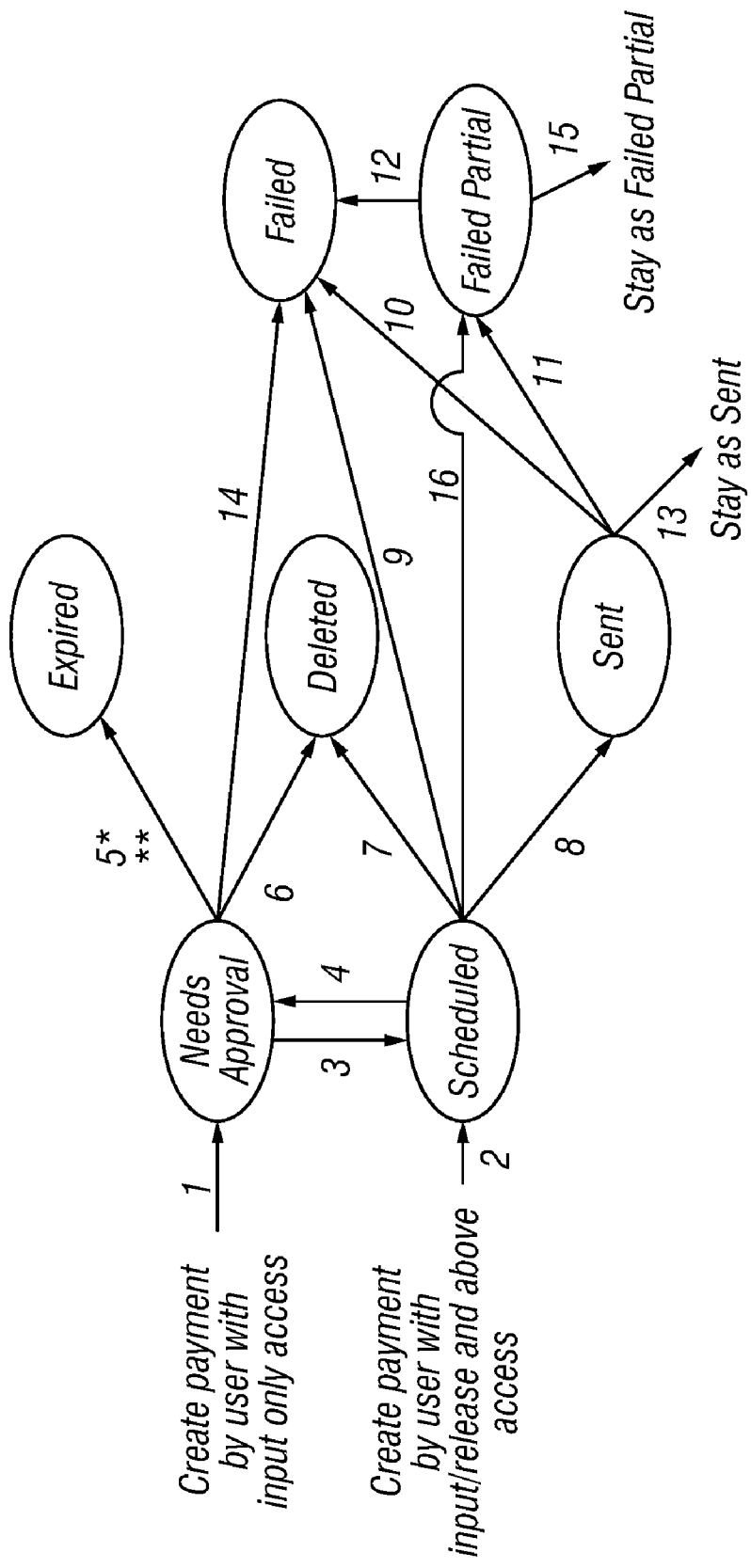
FIG. 8 is one embodiment of a payment life cycle.

FIG. 8 and Tables 4 and 5 are one embodiment of a payment life cycle, showing various payment statuses to be displayed to a User when using Payment Interface 100, approvals required, and messages that may be displayed to the User. The numbers in brackets in the Definition column of Table 4 refer to the numbers indicating transition rules in FIG. 8. The meanings of the asterisk comments of Table 4 are listed in Table 5.

As one example of FIG. 8 and Tables 4 and 5, when a payment's cutoff date/time has passed, the display status for the payment will be "Sent," but internally the system will know that the process of debiting the Customer's account has begun but has not completed, etc.

TABLE 4

Payment Life Cycle Definitions

| Display Payment Status | Definition | Display Payment Status and Status Description |
|---|---|---|
| *Needs Approval | A user with only Input access created the payment [1] (or made changes to it after it was approved [4]) and it needs to be approved by a user with at least Input/Release access. | Needs Approval - Payment must be approved in order for it to be scheduled. Otherwise payment will expire without being sent. |
| *Scheduled | A user with at least Input/Release access created the payment [2], or has approved the payment if created by a user with only Input access [3]. | Scheduled - Payment is scheduled and will be processed based on instructions. |
| Sent | The cutoff date/time for the send on date, taking into consideration the one or two day selection, has passed (even if batch has not run yet) for the payment in Scheduled status [8**]. The payment can no longer be modified or deleted. If the IDN is in frozen status at the cutoff date/time, the payment status is changed to "Failed" [9**, 14**]. If all Counterparties in the payment are Inactive, the payment status is changed to "Failed" [9]. In most cases, once a payment's status is set to Sent, that will be its final status for display purposes [13]. However, if there is a problem with the payment its final status will be set to Failed or Failed Partial as specified below. | Sent - Payment was processed based on instructions. |
| Expired | The payment for an Active IDN was still in Needs Approval status when the cutoff date/time for the payment passed [5**] (even if batch has not run yet). | Expired - Payment was created but never approved. Payment was not sent. |
| Deleted | The payment was deleted [6, 7]. | If a one-time payment or an individual occurrence of a recurring payment was deleted directly by the user, display as: Deleted - This one-time payment was deleted by the user. If a recurring payment model was deleted (even one that had only one occurrence remaining) directly by the user, display as: Deleted - This recurring payment was deleted by the user. If payment was deleted indirectly by the user, display as: Deleted - This payment was deleted. Payment is considered directly deleted if the user deleted a specific payment or a recurring model with the intention of deleting that payment. Payment can be deleted indirectly by some other action by user/system. Some of the examples are: user deleted last Counterparty in a payment, IDN status changes to closed etc. |
| Failed | For a Failed payment no Counterparties were successfully paid-- this can be the case for the following reasons. The payment was not sent due to non-sufficient funds in the funding account [10], or the payment was sent but none of the Counterparties' payments were successful [12], or for any other reason the entire payment failed (e.g., IDN is frozen at cutoff date/time [9**, 14**], all the Counterparties in the payment were Inactive [9]). | If the payment failed because of NSF (Non sufficient funds), display as: Failed - This payment failed because of insufficient funds in the funding account. If the payment failed because all the Counterparties were inactive at the time payment was to be sent, or because payment for all the Counterparties was returned or rejected, or a combination thereof, display as: Failed - This payment failed because all Counterparties were inactive when payment was sent, or payment for all Counterparties was returned or rejected. If the payment Failed because IDN was |

TABLE 4-continued

Payment Life Cycle Definitions

| Display Payment Status | Definition | Display Payment Status and Status Description |
|---|---|---|
| | | frozen at the cut-off date/time for this payment, display as:<br>Failed - This payment failed because the IDN associated with the payment was frozen at cut-off time.<br>If the payment failed because of restrictions and restraints on the From account:<br>Failed - This payment failed because the funding account had restrictions that prevented payment.<br>If the payment failed because of invalid account status on the From account:<br>Failed - This payment failed because the funding account had an invalid account status.<br>If the payment Failed because of a problem with an internal To account:<br>Failed - An internal processing error occurred which prevented payment.<br>If entire payment failed because of an internal system problem, display as:<br>Failed - An internal processing error occurred which prevented payment. |
| Failed Partial | For a Failed Partial payment the payment to at least one Counterparty was successful (or at least was sent and not yet rejected or returned) and the payment to at least one Counterparty was unsuccessful or not sent. Applicable reasons and flows are:<br>At cutoff time on the send date, at least one, but not all, Counterparties were Inactive [16].<br>All Counterparties were Active at the cutoff time on the send date, and the payment for at least one Counterparty, but not all, was rejected or returned [11]. | Display as:<br>Failed Partial - This payment was processed as scheduled but one or more Counterparties were not payable. |

TABLE 5

Notes for Table 4

| | |
|---|---|
| *Future Payments and Past Payments | References to "future" payments mean payments that have a status of Needs Approval or Scheduled. However, if a payment's cutoff date/time has passed but the status has not yet been changed from Needs Approval or Scheduled, it should not be considered to be a future payment. All payments that are not future payments are considered to be "past payments". |
| ** Difference in payment status transition for Active and Frozen IDNs | If the IDN status was Frozen at the time of cutoff, all the future payments that had a send date of today will be changed to Failed status as soon as the cutoff passes (irrespective whether they were in Needs Approval status or Scheduled status). If the IDN was Active at the time of cutoff, these payments will follow normal transition rules. In other words, payment status transition rules 9 and 14 above apply only for Frozen IDNs and payment status transition rules 5 and 8 apply only for Active IDNs. |

Counterparties and Pay Groups

Counterparties are added into PI 100 by entering items such as the Counterparty's personal details (name, email, Counterparty IDN) and account details (account number, RTN, account type). The PI will do RTN number check against static table to validate it, and then will send Counterparty account number for verification, whenever a Counterparty is added. Time required for account verification differs depending upon whether the account is an Internal Account or an External Account. Multiple Counterparties with the same name can exist in the system for the same IDN so that user can pay the same person on multiple accounts. Counterparty's email address will be used to inform the Counterparties about payments made to his/her account.

A Counterparty Master List for an IDN consists of all Counterparty for that IDN. A Pay Group is created by selecting Counterparties from the Counterparty Master List and is given a name by the user who creates it. The Counterparty Master List itself is considered to be a Pay Group with a name of "Counterparty Master List". When requirements specify that a list of Pay Groups be displayed, the Counterparty Master List is included unless otherwise specified.

There are two types of statuses for a Counterparty. The first is generally referred to as "Counterparty Status" and controls whether payments can be created or sent for the Counterparty. This is the status that is displayed when a Counterparty's status is displayed without regard to a payment or when the Counterparty's status for a specific future payment is displayed. The second status is referred to as "Payment status for a Counterparty for a past payment" and it is related to a specific past payment made, or attempted to be made, to that Counterparty.

A Counterparty's status can be either Active or Inactive. Payments can only be created or sent to Counterparties with an "Active" status. A Counterparty's status will be changed from Inactive to Active when the situation that changed his status to Inactive is "fixed". If a Counterparty had a status of Active when a payment was created and thus was eligible to be included in the payment, and subsequently his status was changed to Inactive, that Counterparty will not be included in the Counterparties being paid when the payment is processed. The following table shows in general terms the types of things that will cause the Counterparty Status to be set to Inactive and what will cause it to be set back to Active. The exact rules for what will set a Counterparty's status to Inactive are contained in the Batch requirements and in the "Counterparty's account status update rules table:" for the "View/Edit Counterparty-Verify" screen. Table 5 lists reasons for modifying the status of a Counterparty.

TABLE 6

Reasons for Changing Counterparty Status

| Reason Set to Inactive | When Reset to Active |
|---|---|
| The Counterparty was pre-noted. Note: All accounts will be pre-noted-it will not be an option selected by the user | For External Accounts, six business days have passed since the pre-note was sent and no negative response has been received from the Counterparty's financial institution. For Internal Accounts, two business days have passed. See Batch requirements for exact requirements. |
| For external Counterparties an NOC or return was received for a pre-note or a payment. For internal | In general, when the "problem" is fixed. See exact rules in the "Counterparty's account status update rules table:" for the "View/Edit |

TABLE 6-continued

Reasons for Changing Counterparty Status

| Reason Set to Inactive | When Reset to Active |
|---|---|
| Counterparties the account failed verification/validation for one of the reasons specified in the batch requirements, or a payment failed for one of the reasons specified in batch. | Counterparty - Verify" screen. |

When the requirements specify that the Counterparty Status be displayed, it is displayed according to Table 6. The difference between columns two and three is that column two is used for those screens that specify that the Counterparty Status be displayed, and column three is used on those screens that specify that the Counterparty Status and its description be displayed. Although the Counterparty Status for display and for the purpose of making payments is limited to "Active" or "Inactive", for a status of Inactive the system will need to capture the specific reason the status was set to Inactive.

TABLE 6

Counterparty Status and Counterparty Status and Status Description

| Counterparty Status | Counterparty Status (For Display) | Counterparty Status and Status Description (For Display) |
|---|---|---|
| Active | Active | Active - Counterparty has been verified and is payable. |
| Inactive | Inactive | If Inactive due to pre-note in process, display as: Inactive - You can begin scheduling payments to this Counterparty in X business days as soon as account information is verified. If Inactive due to a NOC (notice of change from ACH) or due to an ACH return, display as: Inactive - <for the specific event/reason for the NOC or return> |

Table 7 lists Payment Status as retained internally to Payment Interface 100, for example in Database 201, and displayed to the user by the Payment Interface. Each Counterparty within a payment has a status for that payment. These are to provide information to the user as to whether the payment for the Counterparty was sent, was returned, etc. Where the requirements call for the "Payment status for a Counterparty for a past payment" to be displayed, the following table specifies what to display.

The difference between columns three and four is that column three in Table 7 is used for those screens that do not call for a description to be included when the status is displayed and column four is used when a description is to be displayed.

TABLE 7

Payment Status as Retained Internally to, and as displayed by, the Payment Interface.

| Payment Status | Payment Status for Counterparty (Internal System Status) | Payment Status for Counterparty (For Display) | Payment Status for Counterparty and Status Description (For Display) |
|---|---|---|---|
| Sent | Sent | Sent | Sent - Payment to Counterparty was processed as scheduled |

TABLE 7-continued

Payment Status as Retained Internally to, and as displayed by, the Payment Interface.

| Payment Status | Payment Status for Counterparty (Internal System Status) | Payment Status for Counterparty (For Display) | Payment Status for Counterparty and Status Description (For Display) |
|---|---|---|---|
| Failed-Partial | Not Sent | Failed | If the payment was not sent because the Counterparty's status was Inactive due to a NOC (notice of change from ACH) or due to an ACH return, display as:<br>Failed - <description for the specific event/reason for the NOC or return><br>Note: it will be rare that multiple NOC's and/or returns will be received for the same Counterparty/account for different reasons. However, if this happens the rules to determine the text to display are:<br>returns always take precedence over NOC's<br>after applying the rule in the first bullet, the earliest received takes precedence<br>If the payment was not sent because the Counterparty's status was Inactive due to a reject (it is a TBD as to whether this condition is necessary), display as:<br>Failed - This payment failed because the Counterparty was inactive at the cut-off time. |
| Failed-Partial | Failed | Failed | If the payment to the Counterparty failed because of a return, display:<br>Failed - <description for the specific event/reason for the return><br>If the payment to the Counterparty failed because of a reject, display:<br>Failed Partial - One or more Counterparties were not payable. |
| Failed-Partial | Sent | Sent | Sent - This payment was processed as scheduled but one or more Counterparties were not payable. |
| Failed | Not Sent | Failed | If the payment was not sent because of NSF, display:<br>Failed - This payment failed because of insufficient funds in the funding account.<br>If the payment was not sent because the IDN was Frozen at the cutoff date/time, display:<br>Failed - This payment failed because the IDN associated with the payment was frozen at the cut-off time.<br>If the payment was not sent because the Counterparty's status was Inactive due to a NOC (notice of change from ACH) or due to an ACH return, display as:<br>Failed - <description for the specific event/reason for the NOC or return><br>Note: it will be rare that multiple NOC's and/or returns will be received for the same Counterparty/account for different reasons. However, if this happens the rules for which Appendix A event to use to determine the text to display are:<br>returns always take precedence over NOC's<br>after applying the rule in the first bullet, the earliest received takes precedence<br>If the payment was not sent because the Counterparty's status was Inactive due to a reject, display as:<br>Failed - This payment failed because the Counterparty was inactive at the cut-off time. |
| Failed | Failed | Failed | If the payment to the Counterparty failed because of a return, display:<br>Failed - <description for the specific event/reason for the return><br>If the payment to the Counterparty failed because of a reject due to restrictions and restraints on the To account: |

TABLE 7-continued

Payment Status as Retained Internally to, and as displayed by, the Payment Interface.

| Payment Status | Payment Status for Counterparty (Internal System Status) | Payment Status for Counterparty (For Display) | Payment Status for Counterparty and Status Description (For Display) |
|---|---|---|---|
|  |  |  | Failed - This payment failed because the Counterparty's account had restrictions that prevented payment. If the payment to the Counterparty failed because of a reject due to invalid account status on the To account: Failed - This payment failed because the Counterparty's account had an invalid account status. |
| Expired | Not Sent | Failed | Failed - Payment was not approved and expired without being sent. |
| Deleted | Deleted | Deleted | Deleted - This payment was deleted. |

Pre-Notes

The purpose of a pre-note is to cut down on the number of returned payments made to Counterparties by verifying the existence of an account prior to sending a "real" payment. This is accomplished by sending a zero amount transaction to the RTN and account number of the Counterparty's account. The Counterparty's status is set to Inactive at the time the pre-note is sent. If a negative response is not received in six business days the account is considered to be "good" and the Counterparty's status is set to Active. If a negative response is received, the Counterparty's status remains Inactive but the reason for the Inactive status is changed from pre-note in progress to whatever the reason for the negative response. Negative responses can be for reasons such as the account doesn't exist, the name sent with the transaction doesn't match the name on the account, etc. For risk mitigation purposes all accounts will be pre-noted—it will not be an option selected by the user. The term pre-note as used herein as though it applies both to internal and External Accounts. However, pre-notes only apply to External Accounts, and Internal Accounts go through a validation/verification process. But in this document the tem "pre-note" is used for both. Not all External Payment Systems have provisions for pre-notes.

External pre-notes are stored in Database 201, Batch Processing Module 221 will include pre-notes to external Counterparties.

The "pre-note" process for Internal Counterparty Accounts does not involve ACH but instead will use internal bank systems to validate the Counterparty's account. A "pre-note" will be sent online to retrieve account information such as whether the account exists, the status, hard hold restraints, etc., and the information will be written to the Database 201. A batch process will then apply business rules to determine if the account is valid to be a Counterparty account. It is expected that this batch process will run every few hours, but see the batch requirements for the requirement for the frequency of this process. Unlike external pre-notes that require waiting for six business days before assuming that an account is "good," Internal Accounts will have a two-day waiting period.

Alerts/Communications

There are three types of Communications that may be sent when triggered by a Payment Interface "event". Examples of "events" would be that a payment to a Counterparty was returned by the receiving financial institution, or the Customer's funding account does not have sufficient funds to fund a payment. The detailed online and batch requirements specify when a Communication is to be sent by stating "send PI Communication #n."

My Message Center alerts—these messages are put in the user's My Message Center Inbox PI Alerts—these messages are put in the ID's PI Alerts Inbox and are a copy of what was sent to the users' My Message Center Inbox. This Inbox can only be accessed by bankers.

External Email—these messages are sent to the user's XA email address(es) or to a Counterparty's email address The following is an example of what the PI rules are for email addresses and receiving PI alerts/communications.

The only PI requirement to force a user to have an email address is for the enrollee at the time of enrollment of the ID. After that there is no enforcement that any PI user, including the enrollee, has an email address.

There is a Yes/No receive IP alerts selection available in IP. When this is changed to "Yes" the user selects his preferences as to which of four addresses to use. It is preferred that there be at least one user with Input/Release/Control access who is set to Yes to receive IP alerts/communications, and that his email preferences be set to emails for which he actually has addresses in XA.

At least one user with Input/Release/Control access must have Alerts set to Yes. The last such user cannot be set to "No: online. If the last such user is removed from IP by a batch process, the batch process will set all remaining users with Input/Release/Control access to Yes for Alerts and their preference will be set to their Primary email.

When a user's access is set to No Access, neither the Yes/No selection is changed nor is any change made to his email preferences.

At each navigation to IP by a Customer or delegate, or when a Banker-as-customer signs on, systematically uncheck email preferences for which the user no longer has an address. If the user is set to Yes to receive alerts/communications and no longer has any preference selected, set the preference to the Primary email address.

When a Customer or Banker-as-customer unfreezes an ID that has a status of Frozen, either for invalid funding account or when no Input/Release/Control users are left, they are systematically set to Yes. If they have any preferences set, they are leave as is, or else the Primary email is selected as the preference.

When a banker-as-banker unfreezes a ID that is Frozen due to no remaining user with Input/Release/Control access by setting a user's access to Input/Release/Control, set Alerts to Yes if not already Yes. If there are already preferences set for the user leave as set. If none are set, select the Primary email address as the preference.

When a user with Input/Release/Control sets another user to "Yes" to receive alerts, the user who is being set to Yes will have his preference set to the Primary email address.

When an owner is enrolled when signing on, as in the case where they have not yet been added by batch, the owner is set to "Yes" for alerts and the first of his email addresses is selected as his preference. If the owner has no email addresses, their Primary email is selected as the preference.

Representative Screen Shots

FIGS. 9 through 17 show representative screens presented to a user of Payment Interface 100, as described. Actual embodiments may include additional screens that are not shown which, for example, are presented to a banker, or to a user for verifying information. The Payment Interface is referred to in FIGS. 9 through 17 as "Direct Pay."

FIGS. 9 and 10 show representative screens as seen by a user of Payment Interface 100 enrolling in the payment interface. The Customer has an account with the financial institution, and is directed to the page shown in FIG. 9 to enroll for using Payment Interface 100. The screen of FIG. 9 has the Company Name and ID. The Customer is prompted for a billing account, that is, the account out of which fees are paid, and a funding account. The Customer is also prompted to provide notification e-mail addresses. The information is then verified in FIG. 10, and an optional plan agreement (not shown) is then provided to the user.

Figure 11:
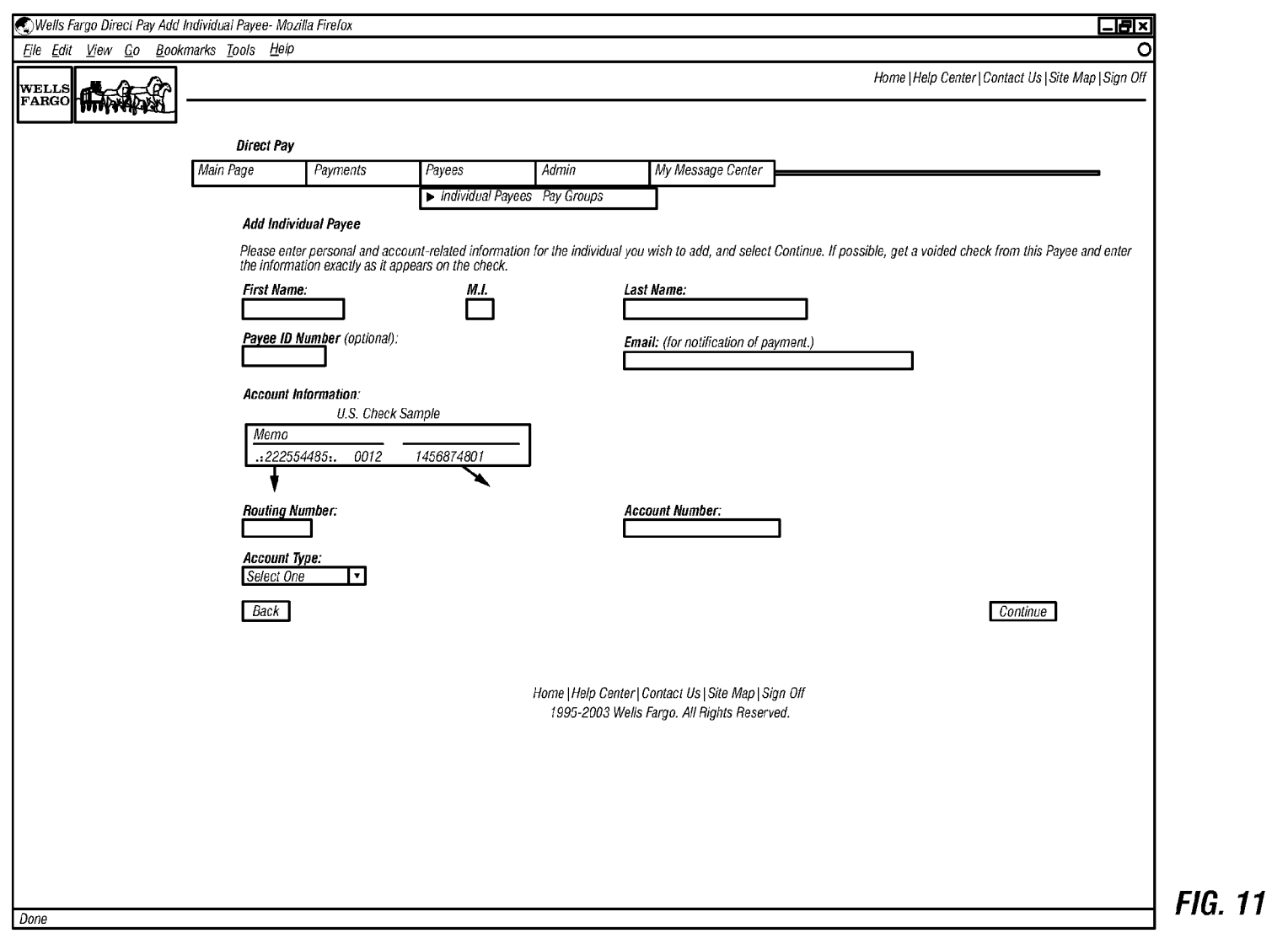

Payments are scheduled by adding Counterparties, forming Counterparty groups, and then scheduling payment for the Pay Groups. FIG. 11 shows a screen for adding a Counterparty payee. The Customer is prompted for a Counterparty name, routing number, account number, and type of account (checking or savings). Optionally, the Customer may provide a Counterparty ID Number and Counterparty e-mail notification address. Importantly, for US Counterparties this is the only information required to electronically deposit funds into the Counterparty account. For international payments, the country and currency may also be required. A similar screen is used to add a Counterparty payer—that is, a Counterparty that is to be sent a debit origination request for transferring funds into the Customer's funding account.

Figure 12:
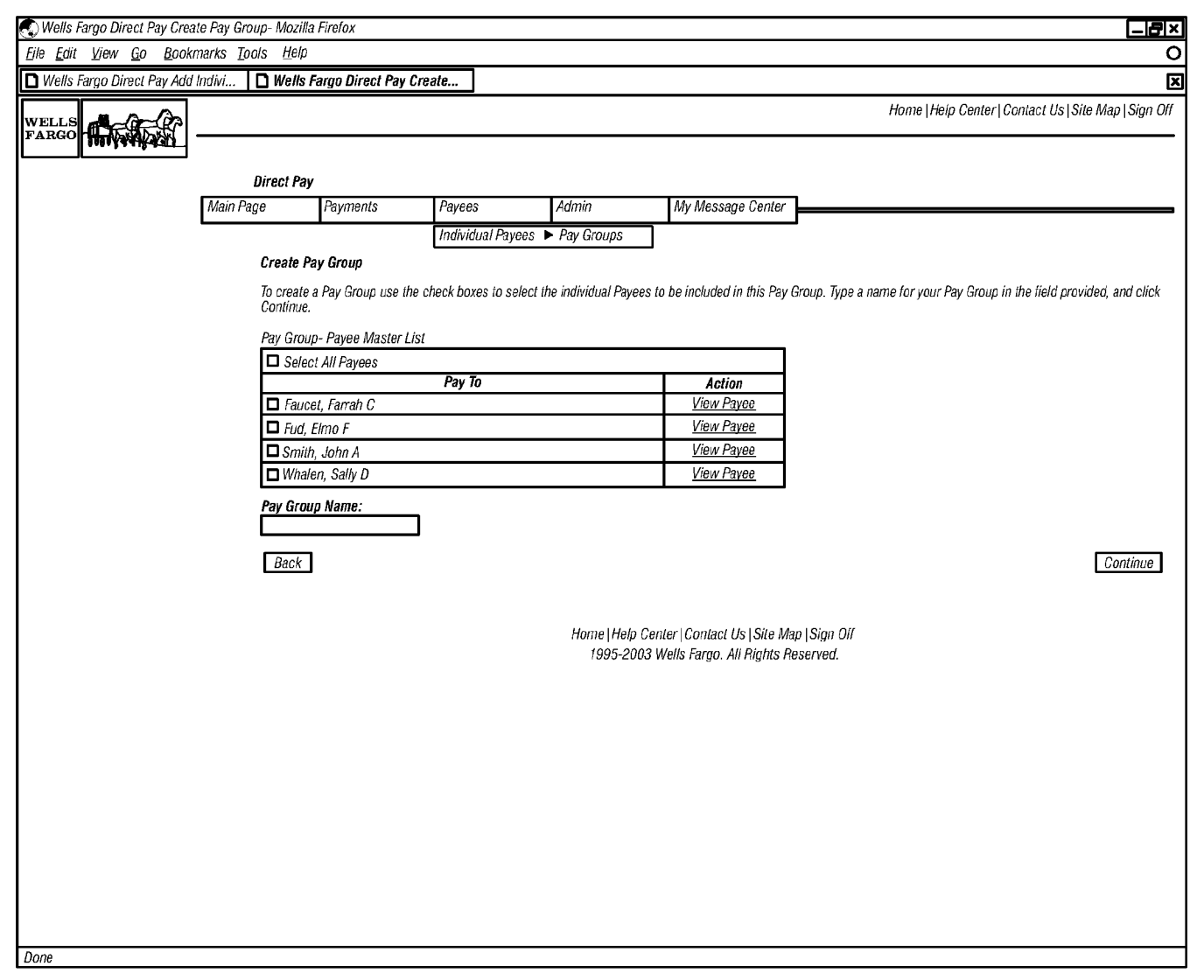

After the Counterparties have been entered, Pay Groups are formed. FIG. 12 shows a screen for forming Pay Group. The Customer is prompted to select one or all of the Counterparties and to assign a name to the Pay Group.

Figure 14:
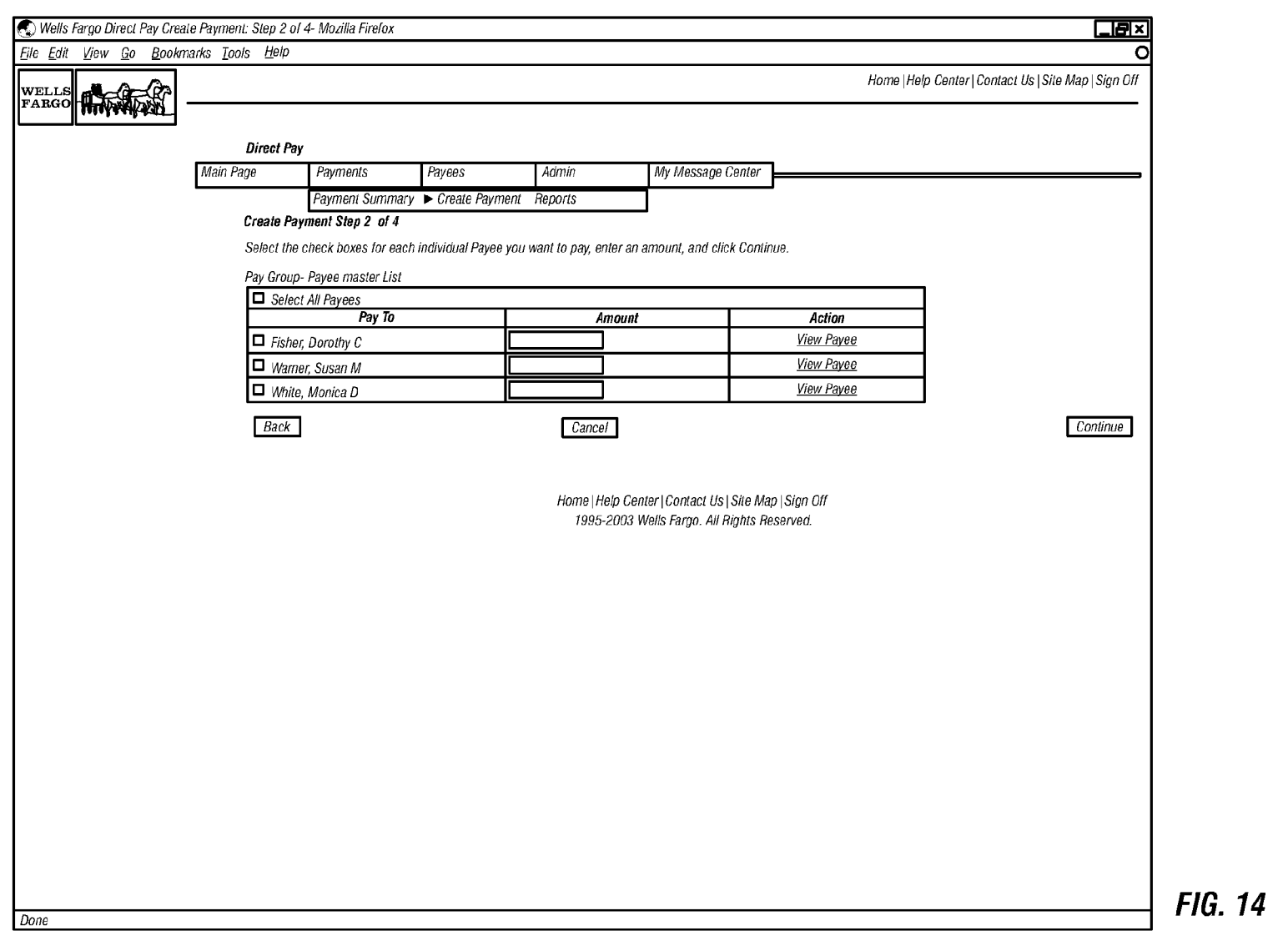

Next, payments are scheduled to the Pay Groups, as shown for example in FIGS. 13-15. First, in the screen of FIG. 13, a Pay Group and frequency of payment (one-time or recurring) is selected. Next, in the screen of FIG. 15, the Customer is prompted to enter a payment amount for each Counterparty in the selected Pay Group. Options are provided to obtain more information on each Counterparty in the Pay Group.

After the amounts have been entered for one or more Counterparties in the Pay Group, deposits are scheduled. The next screens that are presented to the Customer depend on whether a one-time or recurring schedule has been selected. FIG. 15 shows a screen for scheduling one-time payments. The Customer is prompted to provide a pay date, send date, and optional description and Counterparty memo. FIG. 16 shows a screen for scheduling recurring payments. The Customer is prompted to provide a pay date, payment pattern (weekly, every other week, twice a month, or monthly), an end date for the pattern, and a send date. Optionally, the Customer may provide a description and Counterparty memo.

As described previously Payment Interface 100 routes payments through the appropriate channels. Thus, for example, payments are routed according to the time frame and Counterparty financial institutions.

FIGS. 15 and 16 are for a Payment Interface 100 not having a Real-Time Payment Module 223, such as a Payment Interface 200. For a Payment Interface 100 having a Real-Time Payment Module 223, such as a Payment Interface 300, the Customer is also provided with the option of a send date that is less than one business day. Such payments as well as any one business day payments not having sufficient time for payment are routed to Real-Time Payment Module 223, while the other payments are routed to Batch Payment Module 221. Real-Time Payment Module 223 and Batch Payment Module 221 determine the proper codes for payment, be it internal, ACH, Fedwire, SWIFT, or another system.

FIGS. 17 and 18 are representative of alert screens reporting payment errors. FIG. 17 shows a screen with an alert detail. Importantly, the alert details what went wrong with the transfer and recommended solutions. For the example of FIG. 17, the alert explains that the payment failed at the Counterparty's receiving institution due to an incorrect account number. It is recommended that the Customer click on the "Payees" tab to correct the payee Counterparty account number and then submit a new payment. As an example of alert generation, Database 201 may contain a table of ACH NOC (Notice of Change) and Return Codes, a plain English explanation of the code, and instructions on how to correct the error, if this is possible. The received codes are translated to e-mail messages that instruct the Customer on how to take corrective action.

FIG. 18 shows a screen with an alert summary table for a Customer. The alerts include normal system message ("Welcome to Direct Pay"), and a list of payments needing approval and those that have failed. The Customer may view details of any of these alerts by following the link on the third column.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. In addition, the instructions may be executed on a single computer or a network of computers, such as an intranet or the Internet.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, while there has been described what is believed to be exemplary embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A computer system for processing employee direct payroll deposits, comprising:
   a computer-readable storage medium having instructions stored therein;
   one or more processors executing the instructions stored in the computer-readable medium to implement
      a counterparty management module to permit an employer to add employee bank accounts to a funds transfer system provided by a banking institution, the employee bank accounts being respectively associated with different employees of the employer, the employer having a bank account at the banking institution, the counterparty management module being accessible to the employer by way of an online banking area of a website of the banking institution, including to
         provide screens to the employer by way of the Internet,
         permit the employer to specify, by providing responses to prompts contained in the screens, a payroll-related pay group that includes the employee bank accounts and to specify characteristics of the transferring of funds to the pay group as a whole,
         permit the employer to specify, by providing responses to the prompts contained in the screens, bank account numbers for each of the employee bank accounts;
      a payment module to generate payment instructions for transferring funds from the employer bank account to the employee bank accounts.

2. The computer system of claim 1, wherein the payment module permits the employer to transfer funds from the employer bank account to the employee bank account after verification of the employee bank account.

3. The computer system of claim 1, wherein the employer bank account includes a billing account number and a funding account number.

4. The computer system of claim 1, wherein the employee bank account is an internal counterparty account.

5. The computer system of claim 1, wherein the employee bank account is an external counterparty account.

6. A computer system for processing employee direct payroll deposits, comprising:
   a computer-readable storage medium having instructions stored therein;
   one or more processors executing the instructions stored in the computer-readable medium to implement
      a counterparty management module to permit an employer to add employee bank accounts to a funds transfer system provided by a banking institution, the employee bank accounts being respectively associated with different employees of the employer, the employer having a bank account at the banking institution, the counterparty management module being accessible to the employer by way of an online banking area of a website of the banking institution, including to
         provide screens to the employer by way of the Internet,
         permit the employer to specify, by providing responses to prompts contained in the screens, a payroll-related pay group that includes the employee bank accounts and to specify characteristics of the transferring of funds to the pay group as a whole, including a time by which the funds are to be transferred,
         permit the employer to specify, by providing responses to the prompts contained in the screens, bank account numbers for each of the employee bank accounts;
      a payment module to
         determine an electronic system to transfer funds to the employee bank accounts based on the received characteristics;
         determine instructions for transferring funds over the determined electronic system for transferring funds from the employer bank account to each of the employee bank accounts; and
         provide the determined instructions to the determined electronic system.

7. The computer system of claim 6, wherein the counterparty management module further permits the employer to specify a routing number and an account type for each of the employee bank accounts.

8. The computer system of claim 7, wherein the counterparty management module further permits the employer to specify a counterparty country.

9. The computer system of claim 6, wherein the electronic system includes one or more of an internal transfer, an ACH transfer, and a Fedwire transfer.

10. The computer system of claim 6, wherein the electronic system includes one or more of an internal transfer, an ACH transfer, a Fedwire transfer, and a SWIFT transfer.

11. The computer system of claim 6, wherein the funds are to be transferred to the employees in the pay group on a recurring basis, and wherein the characteristics of the time by which the funds are to be transferred comprise characteristics of recurring payments to be made to the employees in the pay group.

12. The computer system of claim 11, wherein the screens comprise a screen that configured to permit the employer to define the pay group, including assign a name to the pay group and select members of the pay group.

13. The computer system of claim 12, wherein the plurality of counterparty accounts comprises an internal account and an external account.

14. The computer system of claim 12, wherein the screens comprise a screen configured to prompt the employer to provide a payee memo to be provided to the employees upon the transferring of funds.

* * * * *